(12) United States Patent
Hill et al.

(10) Patent No.: US 7,315,300 B2
(45) Date of Patent: ***Jan. 1, 2008

(54) TOUCH SENSITIVE DEVICE EMPLOYING IMPULSE RECONSTRUCTION

(75) Inventors: Nicholas P. R. Hill, Cambridge (GB); Darius M. Sullivan, Cambridge (GB)

(73) Assignee: 3M Innovative Properties Company, St. Paul, MN (US)

( * ) Notice: Subject to any disclaimer, the term of this patent is extended or adjusted under 35 U.S.C. 154(b) by 660 days.

This patent is subject to a terminal disclaimer.

(21) Appl. No.: 10/750,290

(22) Filed: Dec. 31, 2003

(65) Prior Publication Data

US 2005/0146511 A1   Jul. 7, 2005

(51) Int. Cl.
   *G09G 5/00*   (2006.01)
(52) U.S. Cl. ............ 345/173; 345/177; 345/160; 345/169; 178/18.01; 178/18.03; 178/18.04
(58) Field of Classification Search ........ 345/173, 345/177, 160, 169; 178/18.01, 18.03, 18.04
   See application file for complete search history.

(56) References Cited

U.S. PATENT DOCUMENTS 7,061,475 B2* 6/2006 Kent .................. 345/177
2001/0006006 A1* 7/2001 Hill .................. 73/606

FOREIGN PATENT DOCUMENTS

WO   WO 01/48684   7/2001
WO   WO 03/005292   1/2003

OTHER PUBLICATIONS

U.S. Appl. No. 09/746,405, filed Dec. 26, 2000, Contact Sensitive Device.
U.S. Appl. No. 60/432,024, filed Dec. 10, 2002, Contact Sensitive Device.
U.S. Appl. No. 10/440,650, filed May 19, 2003, Vibration Sensing Touch Input Device.
U.S. Appl. No. 10/683,342, filed Oct. 10, 2003, Wake-on-Touch for Vibration Sensing Touch Input Devices.
U.S. Appl. No. 10/750,291, filed Dec. 31, 2003, Touch Sensing With Touch Down and Lift off Sensitivity.
U.S. Appl. No. 10/750,502, filed Dec. 31, 2003, Touch Sensitive. Device Employing Bending Wave Vibration Sensing and Excitation Transducers.

* cited by examiner

*Primary Examiner*—Richard Hjerpe
*Assistant Examiner*—Leonid Shapiro

(57) ABSTRACT

A touch sensitive apparatus includes a touch plate and a number of sensors coupled to the touch plate. Each of the sensors is configured to sense bending waves in the touch plate and, in response to a touch to the touch plate, generate sensor signals. A controller is coupled to the sensors. The controller corrects for dispersion in the sensor signals and determines a location of the touch using the dispersion corrected signals. The controller performs impulse reconstruction, by which impulses representative of impulses generated by the touch to the touch sensitive device are produced. Using the reconstructed impulses, the controller confirms the location of the touch.

28 Claims, 23 Drawing Sheets

TOUCH SENSITIVE DEVICE EMPLOYING IMPULSE RECONSTRUCTION

FIELD OF THE INVENTION

The present invention relates to vibration sensing touch sensitive devices and, more particularly, to techniques for reconstructing an impulse originally generated by a contact or touch to a dispersive medium.

BACKGROUND

Interactive visual displays often include some form of touch sensitive screen. Integrating touch sensitive panels with visual displays is becoming more common with the emergence of next generation portable multimedia devices. One popular touch detection technology, referred to as Surface Acoustic Wave (SAW), uses high frequency waves propagating on the surface of a glass screen. Attenuation of the waves resulting from contact of a finger with the glass screen surface is used to detect touch location. SAW employs a "time-of-flight" technique, where the time for the disturbance to reach the pickup sensors is used to detect the touch location. Such an approach is possible when the medium behaves in a non-dispersive manner, such that the velocity of the waves does not vary significantly over the frequency range of interest.

SUMMARY OF THE INVENTION

The present invention is directed to apparatuses and methods for reconstructing an impulse generated by a contact or touch to a touch sensitive medium. The present invention is also directed to apparatuses and methods for confirming a location of a contact or touch to a touch sensitive medium. According to an embodiment of the present invention, a touch sensitive apparatus includes a touch plate and a number of sensors coupled to the touch plate. Each of the sensors is configured to sense bending waves in the touch plate and, in response to a touch to the touch plate, generate sensor signals. A controller is coupled to the sensors. The controller corrects for dispersion in the sensor signals and determines a location of the touch using the dispersion corrected signals. The controller performs impulse reconstruction, by which impulses representative of impulses generated by the touch to the touch sensitive device are produced. Using the reconstructed impulses, the controller confirms the location of the touch.

According to another embodiment, a method for use with a touch sensitive device involves generating, in response to a touch to the touch sensitive device, sensor signals that exhibit dispersion. The dispersion in the sensor signals is corrected to produce dispersion corrected signals, and a location of the touch is determined using the dispersion corrected signals. The method further involves reconstructing impulses representative of impulses generated by the touch to the touch sensitive device. Using the reconstructed impulses, the location of the touch may be confirmed. Confirming the location of the touch typically involves assessing similarity of one or more features of the reconstructed impulses. The touch location is considered valid if the reconstructed impulse similarity exceeds a preestablished threshold. The touch location is considered invalid if the reconstructed impulse similarity fails to exceed the preestablished threshold.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

BRIEF DESCRIPTION OF THE DRAWINGS

FIG. 1b graphically shows the frequency response of the dispersive impulse response of FIG. 1a obtained by taking the Fourier Transform of the impulse response of FIG. 1a;

Figure 1A:
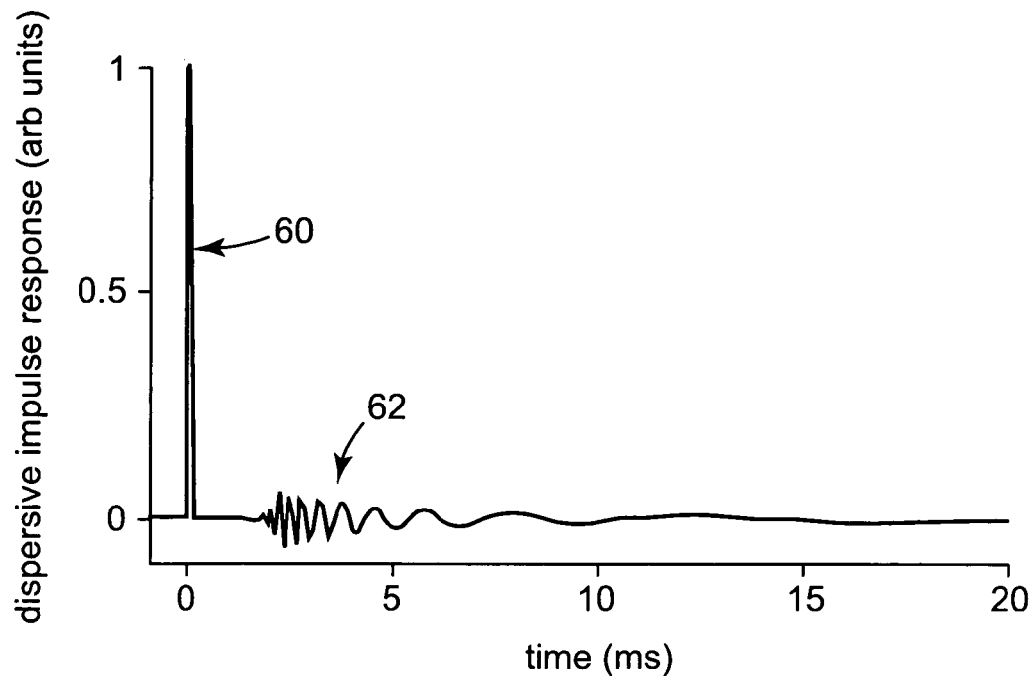
FIG. 1a graphically shows an impulse response in an ideal medium with a square root dispersion relation.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF VARIOUS EMBODIMENTS

In the following description of the illustrated embodiments, reference is made to the accompanying drawings which form a part hereof, and in which is shown by way of illustration, various embodiments in which the invention may be practiced. It is to be understood that the embodiments may be utilized and structural changes may be made without departing from the scope of the present invention.

The present invention relates to touch activated and user interactive devices that sense vibrations that propagate along a touch substrate for sensing by a number of touch transducers. Embodiments of the present invention are directed to structures and techniques for reconstructing an impulse generated by a contact or touch to a touch sensitive medium, and, in particular, a dispersive medium. Embodiments of the present invention are also directed to structures and techniques for confirming a location of a contact or touch to a touch sensitive medium. Further embodiments of the present invention are directed to structures and techniques that provide for improved touch detection and location determination. Such enhancements include, but are not limited to, improved rejection of spurious touches to the casing or support structure of a touch sensitive device, improved z-axis or contact strength determinations, improved accuracy in determining touch location in the presence of ambiguity or noise, improved identification of contact implement type and related properties, and improved rejection of spurious contact data generated by background acoustic noise, either airborne or structural.

The impulse reconstruction techniques described herein are useful in touch sensing apparatuses of varying configurations. For example, the techniques involving impulse reconstruction of the present invention may be employed in touch sensitive apparatuses that employ as few as three pickup sensors. The impulse reconstruction techniques of the present invention may also be employed in touch sensitive apparatuses that employ four or more pickup sensors, such as a configuration in which a pickup sensor is positioned at each of the four corners of a rectangular-shaped touch sensitive plate, for example. The techniques involving impulse reconstruction of the present invention may further be employed in touch sensitive apparatuses that employ a number of pickup sensors and at least one excitation transducer.

It is noted that, in a configuration that incorporates an excitation transducer in addition to several pickup sensors, the excitation transducer may or may not directly participate in the processes of impulse reconstruction. For example, an excitation transducer according to one embodiment may be configured as a dual purpose sense and excitation transducer, capable of directly participating in impulse reconstruction processes. In configurations in which the excitation transducer does not participate directly in impulse reconstruction, the excitation transducer may be used to provide enhanced features and functionality to a touch sensitive apparatus.

The excitation transducer may indirectly participate in impulse reconstruction processes by, for example, facilitating a plate calibration procedure by which relative or absolute dimensions of the touch sensitive plate may be determined. The plate dimension data is information used to perform impulse reconstruction according to embodiments of the present invention. By way of further example, the dispersion relation of the touch sensitive plate may be determined using techniques involving the excitation transducer. Another capability is directed to pickup sensor calibration, in which differences in sensor phase response are determined, and corrections are made to the measured bending wave signals to accommodate such differences in sensor phase response.

Other capabilities involving the use of an excitation transducer include enhanced lift-off detection, improved sensitivity to light touches, and improved wake-on-touch functionality. Details of various methodologies directed to lift-off detection and improved sensitivity to light touches are described in commonly owned co-pending U.S. patent application Ser. No. 10/750,291 entitled "Touch Sensing with Touch Down and Lift Off Sensitivity," filed concurrently herewith and incorporated herein by reference. Details of various wake-on-touch methodologies are disclosed in U.S. patent application Ser. No. 10/683,342, filed Oct. 10, 2003, which is incorporated herein by reference.

A touch sensing apparatus implemented in accordance with the present invention may incorporate one or more of the features, structures, methods, or combinations thereof described herein. It is intended that such a device or method need not include all of the features and functions described herein, but may be implemented to include selected features and functions that, in combination, provide for unique structures and/or functionality. For example, and as discussed previously, the impulse reconstruction techniques described herein may be implemented in touch sensing apparatuses of varying configurations, including those that employ pickup sensors and no excitation transducer and those that employ both pickup sensors and at least one excitation transducer.

In vibration sensing touch input devices that include piezoelectric sensors, for example, vibrations propagating in the plane of the touch panel plate stress the piezoelectric sensors, causing a detectable voltage drop across the sensor. The signal received can be caused by a vibration resulting directly from the impact of a direct touch input or the input of energy with a trace (friction), or by a touch input influencing an existing vibration, for example by attenuation of the vibration. The signal received can also be caused by an unintended touch input, such as a touch input resulting from user handling or mishandling of the touch input device, or from environmental sources external to, but sensed by, the touch input device.

According to one touch sensing approach, upon receiving a signal indicative of a direct touch, for example, the differential times at which the same signal is received at each of the sensors can be used to deduce the location of the touch input. When the propagation medium is a dispersive medium, the vibration wave packet, which is composed of multiple frequencies, becomes spread out and attenuated as it propagates, making interpretation of the signal difficult. As such, it has been proposed to convert the received signals so they can be interpreted as if they were propagated in a non-dispersive medium. Such a technique is particularly suited to systems that detect bending wave vibrations.

Techniques for addressing vibration wave packet dispersion and producing representative signals corrected for such dispersion are disclosed in International Publications WO 2003/005292 and WO 01/48684; U.S. patent application Ser. No. 09/746,405 filed Dec. 26, 2000; U.S. Provisional Application 60/432,024 filed Dec. 10, 2002; and in commonly owned U.S. patent application Ser. No. 10/440,650, each of which is incorporated herein by reference.

The term bending wave vibration refers to an excitation, for example by the contact, which imparts some out of plane displacement to a member capable to supporting bending wave vibrations. Many materials bend, some with pure bending with a perfect square root dispersion relation and some with a mixture of pure and shear bending. The dispersion relation describes the dependence of the in-plane velocity of the waves on the frequency of the waves.

For purposes of enhancing an understanding of vibration wave packet dispersion and producing representative signals corrected for such dispersion, reference is made to FIGS. 1a-1d. FIG. 1a shows an impulse in an ideal medium with a square root dispersion relation and demonstrates that a dispersive medium does not preserve the waveshape of an impulse. The outgoing wave 60 is evident at time t=0 and the echo signal 62 is spread out over time, which makes a determination of an exact contact position problematic.

In a non-dispersive medium such as air, a periodic variation of the frequency response is characteristic of a reflection, and is often referred to as comb filtering. Physically, the periodic variation in the frequency response derives from the number of wavelengths that fit between the source and the reflector. As the frequency is increased and the number of wavelengths fitting in this space increases, the interference of the reflected wave with the outgoing wave oscillates between constructive and destructive.

Figure 1B:
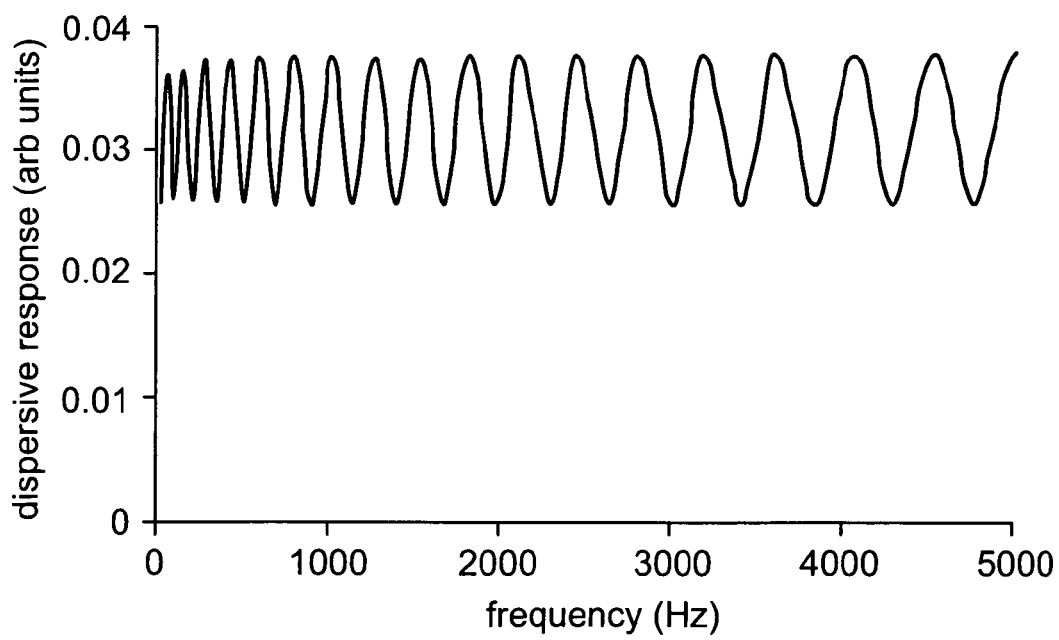

Calculating the Fourier transform of the dispersive impulse response of FIG. 1a produces the frequency response shown in FIG. 1b. The frequency response is non-periodic and the periodic variation with wavelength translates to a variation in frequency that gets slower with increasing frequency. This is a consequence of the square root dispersion in which the wavelength is proportional to the square root of the inverse of frequency. The effect of the panel on the frequency response is therefore to stretch the response as a function of frequency according to the panel dispersion. Consequently, a correction for the panel dispersion may be applied by applying the inverse stretch in the frequency domain, thus restoring the periodicity present in the non-dispersive case.

By warping the frequency axis with the inverse of the panel dispersion, FIG. 1b may be transformed into the frequency response for the non-dispersive case (FIG. 1c) in which the frequency of excitation is proportional to the inverse of the wavelength. This simple relationship translates the periodic variation with decreasing wavelength to a periodic variation with increasing frequency as shown in FIG. 1c.

Figure 1C:
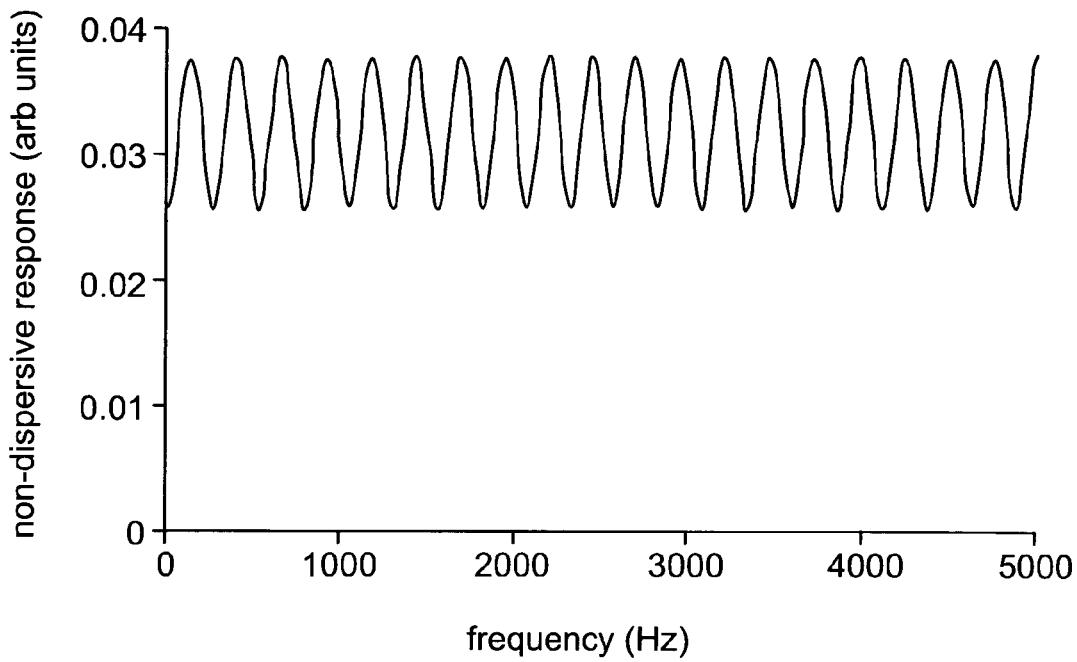
FIG. 1c graphically shows a dispersion corrected transformation of the dispersive frequency response shown in FIG. 1b obtained by warping the frequency axis with the inverse of the touch panel dispersion.
Figure 1D:
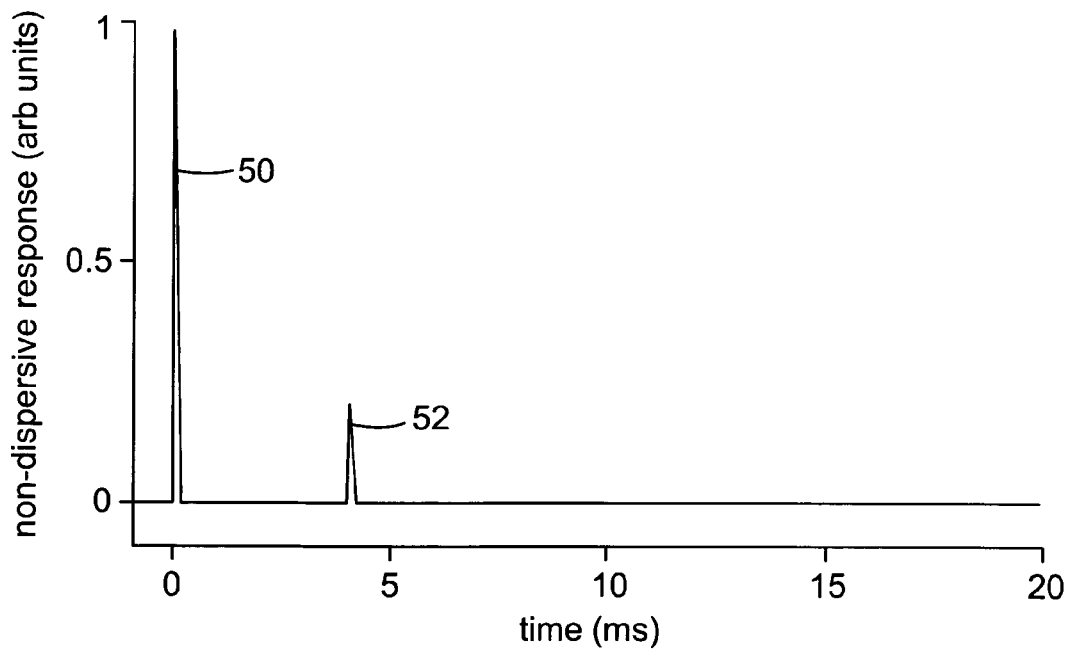
FIG. 1d shows a non-dispersive impulse response produced by applying the inverse Fast Fourier Transform (FFT) to the trace of FIG. 1c, which has been corrected for dispersion.

Applying the inverse Fast Fourier Transform (FFT) to the trace of FIG. 1c produces an impulse response shown in FIG. 1d, which is corrected for dispersion and where the clear reflection is restored. As is shown in FIG. 1d, any particular waveshape of an impulse is preserved in time since the waves travelling in a non-dispersive medium have a constant velocity of travel, independent of their frequency. Accordingly, the task of echo location is relatively straight forward. The outgoing wave 50 is evident at time t=1, together with a clear reflection 52 at 4 ms. The reflection 52 has a magnitude which is approximately one-quarter of the magnitude of the outgoing wave 50.

It is noted that the procedure described above is not applicable if the impulse has occurred at an unknown time $t_0$ and the distance x from the response to an initial impulse may only be calculated if the impulse occurs at $t_0$=0. A dispersion corrected correlation function may be employed in situations where the precise time, $t_0$, at which a contact occurred is not known. According to one approach, a first sensor mounted on a structure capable of supporting bending waves measures a first measured bending wave signal. A second sensor is mounted on the structure to determine a second measured bending wave signal. The second measured bending wave signal is measured simultaneously with the first measured bending wave signal. A dispersion corrected function of the two measured bending wave signals is calculated, which may be a dispersion corrected correlation function, a dispersion corrected convolution function, a dispersion corrected coherence function or other phase equivalent function. The measured bending wave signals are processed to calculate information relating to the contact by applying the dispersion corrected function. Details concerning this approach are disclosed in previously incorporated PCT application 01/48684 and U.S. patent application Ser. No. 09/746,405.

Another approach to correcting for dispersion in bending wave sense signals involves use of an excitation transducer together with pickup sensors disposed at the corners of a touch sensitive plate. According to this approach, a transfer function of the input at the excitation transducer to the output at each of the pickup sensors is determined. This transfer function may be obtained using a number of standard methods. Such known methods include the following: stimulation by a maximum length sequence (MLS) signal and cross-correlation to obtain the impulse response; use of an adaptive filter with a noise-like signal; averaged ratio of complex frequency responses; direct input and measurement of an impulse; and measurement of a linear chirp signal with Time Delay Spectrometry (TDS), among others.

The measured transfer function may be presented in terms of an impulse response, which will generally show dispersion. Dispersion results from the dependence of the bending wave velocity on frequency, which for pure bending is a square root dependence. Previously incorporated U.S. patent application Ser. No. 09/746,405 describes a method by which the dispersion of a signal may be corrected by a transformation that interpolates the frequency axis of a transfer function onto a wave vector. Taking the inverse FFT then yields an impulse response as a function of distance, with all frequency components aligned to correct for the effects of dispersion.

If the absolute velocity as a function of frequency is known from knowledge of the material properties of the touch sensitive panel, then the dispersion corrected impulse response may be returned as a function of absolute distance. If, however, this relationship is not known, then an arbitrary scaling of the distance axis still allows useful information to be determined, such as the aspect ratio of the touch sensitive plate. Additional details of this technique are described in commonly owned co-pending U.S. patent application Ser. No. 10/750,502 entitled "Touch Sensitive Device Employing Bending Wave Vibration Sensing and Excitation Transducers," filed concurrently herewith and incorporated herein by reference.

Figure 2:
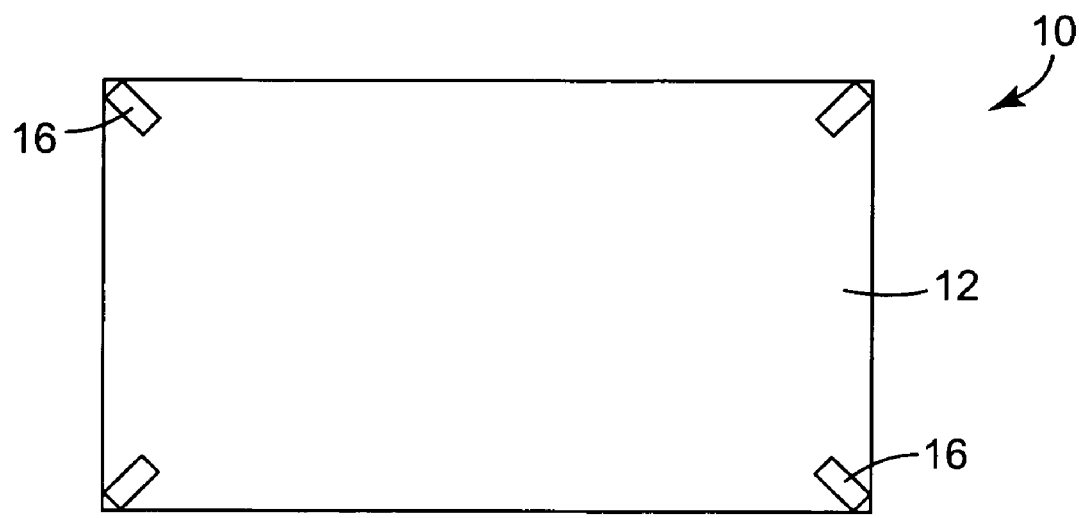
FIG. 2 illustrates one configuration of a touch sensitive device that incorporates features and functionality for detecting bending wave vibrations in accordance with an embodiment of the present invention.

Turning now to FIG. 2, there is illustrated one configuration of a touch sensitive device 10 that incorporates features and functionality for detecting bending wave vibrations. According to this embodiment, the touch sensitive device 10 includes a touch substrate 12 and vibration sensors 16 coupled to an upper surface of the touch substrate 12. In this illustrative example, the upper surface of the touch substrate 12 defines a touch sensitive surface. Although sensors 16 are shown coupled to the upper surface of the touch substrate 12, the sensors 16 can alternatively be coupled to the lower surface of the touch substrate 12. In another embodiment, one or more sensors 16 may be coupled to the upper surface while one or more other sensors 16 may be coupled to the lower surface of the touch substrate 12.

Touch substrate 12 may be any substrate that supports vibrations of interest, such as bending wave vibrations. Exemplary substrates 12 include plastics such as acrylics or polycarbonates, glass, or other suitable materials. Touch substrate 12 can be transparent or opaque, and can optionally include or incorporate other layers or support additional functionalities. For example, touch substrate 12 can provide scratch resistance, smudge resistance, glare reduction, anti-reflection properties, light control for directionality or privacy, filtering, polarization, optical compensation, frictional texturing, coloration, graphical images, and the like.

In general, the touch sensitive device 10 includes at least three sensors 16 to determine the position of a touch input in two dimensions, and four sensors 16 may be desirable in some embodiments, as discussed in International Publications WO 2003 005292 and WO 0148684, and in U.S. patent application Ser. No. 09/746,405. In the present invention, sensors 16 are preferably piezoelectric sensors that can sense vibrations indicative of a touch input to touch substrate 12. Useful piezoelectric sensors include unimorph and bimorph piezoelectric sensors. Piezoelectric sensors offer a number of advantageous features, including, for example, good sensitivity, relative low cost, adequate robustness, potentially small form factor, adequate stability, and linearity of response. Other sensors that can be used in vibration sensing touch sensitive devices 10 include electrostrictive, magnetostrictive, piezoresistive, acoustic, and moving coil transducers/devices, among others.

In one embodiment, all of the sensors 16 are configured to sense vibrations in the touch substrate 12. In another embodiment, one or more of the sensors 16 can be used as an emitter device to emit a signal that can be sensed by the other sensors 16 to be used as a reference signal or to create vibrations that can be altered under a touch input, such altered vibrations being sensed by the sensors 16 to determine the position of the touch. An electrodynamic transducer may be used as a suitable emitter device. Moreover, one or more of the sensors 16 can be configured as a dual purpose sense and excitation transducer. Sensors 16 can be affixed or bonded to touch substrate 12 by any suitable means, such as by use of an adhesive.

When the touch sensitive device 10 is operating with an active sensor 16, i.e. with an emitting transducer generating an excitation signal, a contact on the touch substrate 12 may exert a non-linear force on the touch substrate 12 so as to generate harmonics of the excitation signal. Signal processing may be used to isolate the excitation signal from the harmonics so that the harmonics may used to determine the contact position in a manner similar to passive sensing. The harmonics effectively constitute a source of bending waves from the contact site.

In a configuration in which the touch sensitive device 10 employs a dual active and passive sensor 16, this sensor 16 may be adapted to switch between active and passive sensing modes depending on whether contact is applied to the touch substrate 12. The touch sensitive device 10 may cycle between resting in passive sensing mode when no contact is detected, switching to active mode sensing when a contact is applied, and returning to passive sensing mode once the contact is removed to await further contacts. This may be advantageous to avoid power drain when the touch sensitive device 10 is unnecessarily in active mode.

Many applications that employ touch sensitive devices 10 also use electronic displays to display information through the touch sensitive devices 10. Since displays are typically rectangular, it is typical and convenient to use rectangular touch sensitive devices 10. As such, the touch substrate 12 to which the sensors 16 are affixed is typically rectangular in shape. Alternatively, the touch substrate 12 may have a more complex shape, for example a curved surface and/or variable thickness. In the case of touch substrate 12 having a complex shape, an adaptive algorithm (e.g., neural net) may be used to decipher the contact location from the bending wave signals received by the sensors 16.

According to one configuration, the sensors 16 are preferably placed near the corners of the touch substrate 12. Because many applications call for a display to be viewed through the touch sensitive devices 10, it is desirable to place the sensors near the edges of the touch substrate 12 so that they do not undesirably encroach on the viewable display area. Placement of the sensors 16 at the corners of a touch substrate 12 can also reduce the influence of reflections from the panel edges.

The contact sensed by the touch sensitive device 10 may be in the form of a touch from a stylus which may be in the form of a hand-held pen. The movement of a stylus on the touch substrate 12 may generate a continuous signal which is affected by the location, pressure and speed of the stylus on the touch substrate 12. The stylus may have a flexible tip, e.g. of rubber, which generates bending waves in the touch substrate 12 by applying a variable force thereto. The variable force may be provided by the tip, which alternatively adheres to or slips across a surface of the touch substrate 12. Alternatively, the contact may be in the form of a touch from a finger that may generate bending waves in the touch substrate 12, which may be detected by passive and/or active sensing. The bending waves may have frequency components in the ultrasonic region (>20 kHz).

Figure 3:
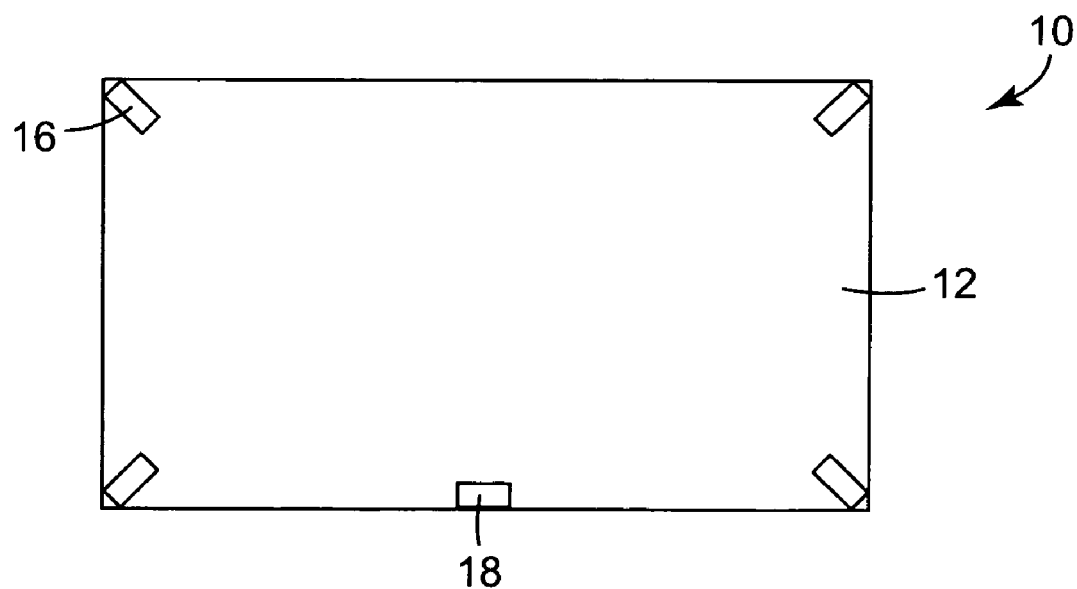
FIG. 3 illustrates another configuration of a touch sensitive device that incorporates pickup sensors and an excitation transducer in accordance with an embodiment of the present invention.

FIG. 3 illustrates another configuration of a touch sensitive device 10 in accordance with an embodiment of the present invention. According to this embodiment, the touch sensitive device 10 includes a number of sensors 16 for sensing bending wave vibrations in the touch substrate 12. The touch sensitive device 10 further includes an excitation transducer 18. The excitation transducer 18 is preferably a "dedicated" transducer 18, in that it is typically not used in normal touch location computations. Rather, normal touch location computations are made using pickup sensors 16. It is understood that excitation transducer 18 may be an emitting transducer or a dual emitter/sensor transducer. In a configuration in which excitation transducer 18 is configured as a dual emitter/sensor transducer, the dual mode transducer is typically not involved in normal touch location determination operations. Use of a dedicated excitation transducer 18 provides the opportunity to perform a variety of functions not readily possible using a conventional sensor/transducer topology.

In the configuration shown in FIG. 3, four sensors 16 are used as vibration pickups. These transducers 16 are preferably optimized for sensitivity to low levels of vibration associated with a light touch. Connection to these transducers 16 may be made with a printed electrode pattern. In addition to their operation as vibration pickups, when a voltage is applied to the sensors 16, energy is transferred into the plate, resulting in generation of bending waves. As such, a sensor 16 can, as discussed above, operate as both a vibration pickup sensor and a bending wave generator. However, the use of a given sensor 16 as a transducer for both vibration pickup and active excitation of the substrate 12 has a number of drawbacks.

One drawback is the inability of a single sensor 16 to operate as both a pickup and an emitter simultaneously. When the sensors 16 are being used as emitters driven by a stimulus, for example, they can not readily be used as simultaneous pickups. The functionality of the substrate 12 in pickup mode is therefore likely to either be impaired or only possible in a multiplexed fashion.

In a configuration that incorporates a buffer circuit between a given sensor 16 and associated sense circuitry, as will be discussed below, such a buffer circuit provides a barrier to the application of a voltage to the sensor 16 when operating as a pickup transducer. Although the buffer circuit may be placed in a reverse bias condition, in which case a voltage applied to the external connections to the substrate 12 is applied directly to the sensor 16, the voltage range over which this may be accomplished in a linear fashion is fairly limited. Also, this approach requires additional circuitry at the controller to which the touch sensitive device 10 is communicatively coupled.

To overcome these and other deficiencies associated with conventional touch sensitive device implementations, a transducer arrangement according to an embodiment of the present invention, and as shown in FIG. 3, incorporates at least one dedicated excitation transducer 18 that provides for active generation of bending waves in the substrate 12. Generation of bending waves may be used to provide for a number of performance improvements and diagnostic features, examples of which are described herein.

Figure 4:
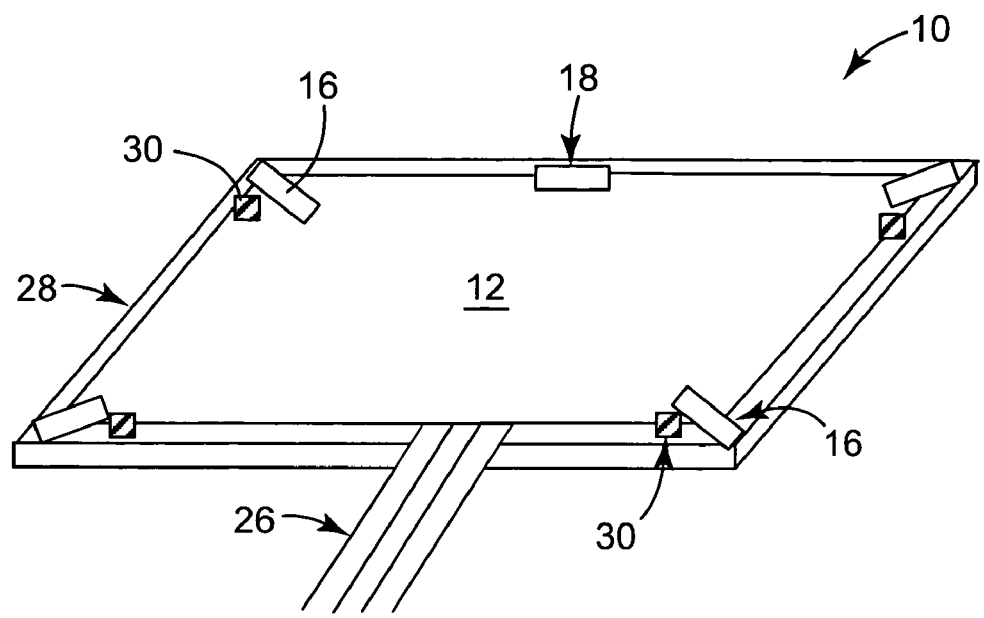
FIG. 4 shows a configuration of a touch sensitive device that incorporates an excitation transducer and pickup sensors coupled to buffer circuits in accordance with an embodiment of the present invention.

Turning now to FIG. 4, there is shown an embodiment of a touch sensitive device 10 in accordance with the present invention. In this embodiment, four sensors 16 are situated at the four corners of the substrate 12. A fifth transducer, an excitation transducer 18, is positioned along an edge of substrate 12 preferably equidistant between two adjacent sensors 16 situated proximate the same edge of the substrate 12. It will be appreciated that the excitation transducer 18 may be positioned at substrate locations other than that shown in FIG. 4. Each of the four sensors 16 and the excitation transducer 18 is connected to respective conductors that are routed to a tail connector 26. A printed electrode pattern may be used as the conductors, as noted above.

FIG. 4 further shows a buffer circuit 30 associated with each of the four corner sensors 16. A buffer circuit 30 may be situated on the substrate 12 adjacent to each sensor 16 to buffer the signals produced by the sensor 16 in response to sensed bending wave vibrations propagating in the substrate 12. Inclusion of the buffer circuits 30 provides several benefits, including increasing the signal to noise ratio of the sensors 16 and reducing the level of EMI interference from the environment. It is desirable that the buffer circuits 30 be situated in close proximity to the sensors 16, as shown in FIG. 4. However, the buffer circuits 30 may be situated elsewhere on the substrate 12 if desired, and may alternatively be integrated into the tail connector 26.

Figure 5:
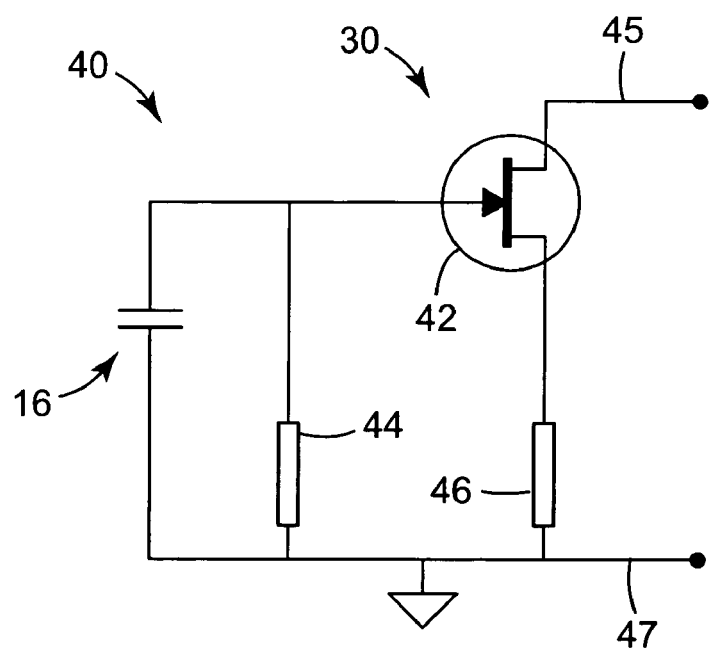
FIG. 5 is a schematic of a buffer circuit configuration suitable for use in the device embodiment shown in FIG. 4.

Each of the buffer circuits 30 includes an amplification circuit, such as that shown in FIG. 5. According to the simplified circuit configuration shown in FIG. 5, buffer circuit 30 includes a transistor 42, such as a field effect transistor (FET), having a base coupled in parallel to a pickup sensor 16 and a resistor 44. The drain of the FET 42, shown as an n-channel JFET (e.g., FET-J-N SST310), is coupled to a first conductor 45. The source of the FET 42 is coupled to a second conductor 47 via resistor 46. Conductors 45 and 47 are coupled to a controller of the touch sensitive device 10. It is noted that other components (not shown) are required off-substrate to properly bias the FET 42. Typical off-substrate components include a power supply, bias resistor, and a capacitive coupling to the analog input of the controller of the touch sensitive device 10.

In the configuration shown in FIG. 5, the pickup sensor 16 is wired such that it is referenced to ground. It will be appreciated that, in an alternative embodiment, the pickup sensor 16 may be wired to provide a differential input to a balanced amplifier, such as a balanced on-board amplifier (e.g., buffer circuit amplifier) or off-board amplifier (e.g., sense amplifier of a touch panel controller). According to this embodiment, each pickup sensor 16 is connected to a balanced input of an amplifier via two balanced wires. The balanced amplifier may be an on-board or off-board amplifier.

In one configuration, each pickup sensor 16 is connected to an off-board balanced amplifier via twisted pair conductors, and an on-board FET 42 need not be used. In another configuration, each pickup sensor 16 is connected to a balanced input of a FET 42 via two balanced wires, and a differential output of the FET 42 is connected to a balanced input of an off-board amplifier via twisted pair conductors. Use of balanced amplifiers according to this embodiment provides for differential pickup sensor voltage measurements. This configuration may provide for improved cancellation of certain sensor signal noise via common mode rejection afforded by differential pickup sensor voltage measurements.

For purposes of illustration, each of the sensors 16 shown in FIG. 4 is oriented approximately 45 degrees relative to the edges of the substrate 12. In addition, one buffer circuit 30 is mounted adjacent to each corner sensor 16. According to one touch sensitive device implementation, the substrate comprises a glass plate having length, width, and thickness dimensions of L=324 mm, W=246 mm, and T=2.2 mm, respectively. In each of the four corners of the substrate 12, a piezoelectric transducer 16 is situated having length, width, and thickness dimensions of L=7 mm, W=3 mm, and T=1 mm, respectively.

Figure 6:
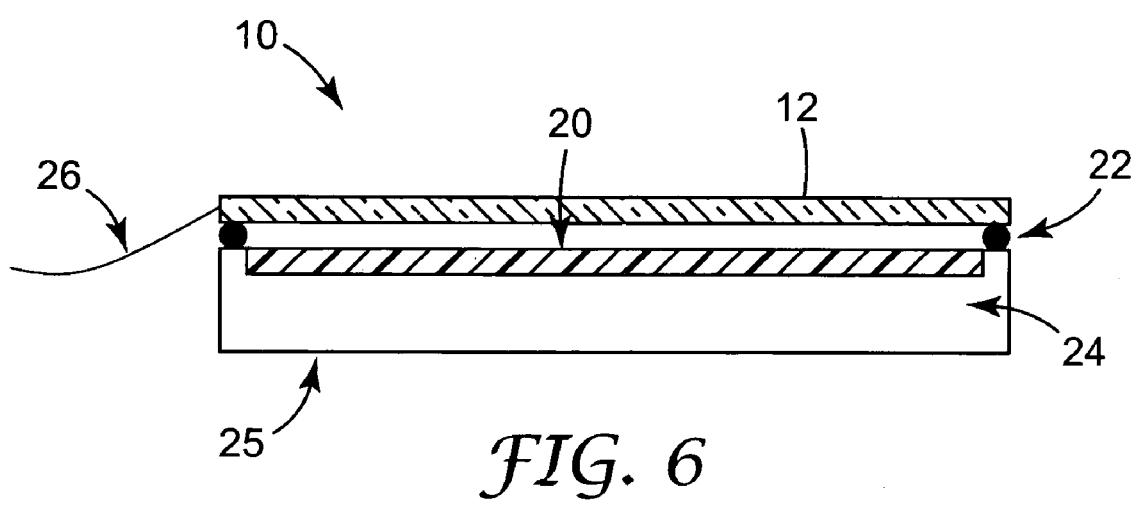
FIG. 6 is a sectional view of a touch sensitive device mounted to a display in accordance with an embodiment of the present invention.

FIG. 6 is a sectional view of a touch sensitive device 10 mounted to a display 25. The display 25 may be any suitable electronic display, such as a liquid crystal display (LCD), an electroluminescent display, a cathode ray tube display, a plasma display, a light emitting diode display, and the like. The display 25 may additionally or alternatively include static graphics that can be permanent or replaceable. The touch sensitive device 10 of the type illustrated in FIG. 6 includes a transparent substrate 12 mounted in front of an LCD screen 20.

The LCD screen 20 is mounted to a frame 24 of the LCD display 25. A foam gasket or mounting 22 is attached to the underside of the substrate 12 and extends substantially around the periphery of the substrate 12. The foam gasket 22 has adhesive surfaces whereby the substrate 12 may be securely attached to any surface. The foam gasket 22 may reduce the reflections from the edge of the substrate 12. A tail connector 26 of the touch sensitive device 10 may be connected to a controller of the touch sensitive device 10.

Figure 7:
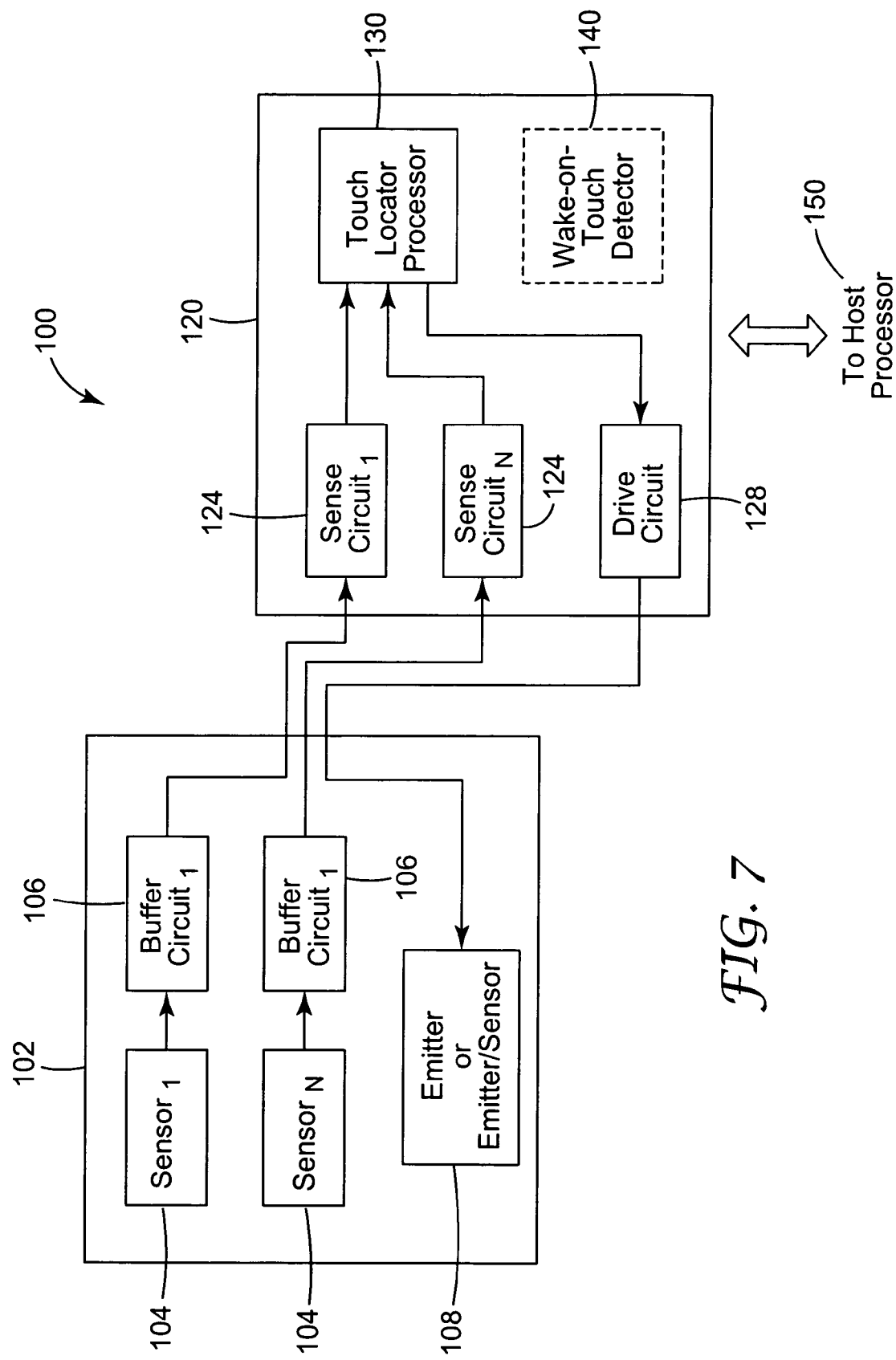
FIG. 7 is a depiction of a touch panel system that includes a touch sensitive device and a touch panel controller in accordance with an embodiment of the present invention.

FIG. 7 is a depiction of a touch panel system 100 that includes a touch sensitive device 102 and a touch panel controller 120. The touch sensitive device 102 includes at least three sensors 104, preferably four sensors 104, each coupled to an associated buffer circuit 106. The touch sensitive device 108 further includes at least one emitter transducer 108. The emitter transducer 108 may be configured to operate only as an excitation transducer or as a dual emitter/sensor transducer. Each of the buffer circuits 106 and emitter transducer 108 is coupled to the controller 120.

The controller 120 includes sense circuits 124 each coupled to one of the sensor/buffer circuit combinations 104/106. The sense circuits 124 typically include one or more of amplification, conditioning, and filtering circuitry. The emitter transducer 108 is coupled to a drive circuit 128 that generates signals that cause the emitter transducer 108 to generate predetermined excitation signals that are imparted to the substrate of the touch sensitive device 102. Each of the drive circuit 128 and sense circuits 124 is coupled to a touch location processor 130. The touch location processor 130 typically includes an analog signal conditioning stage, an analog-to-digital converter (ADC) sampling at an appropriate sampling frequency (e.g., 200 kHz), and a digital signal processor (DSP) that implements coordinate location algorithm/firmware and other algorithms and routines.

Figure 8:
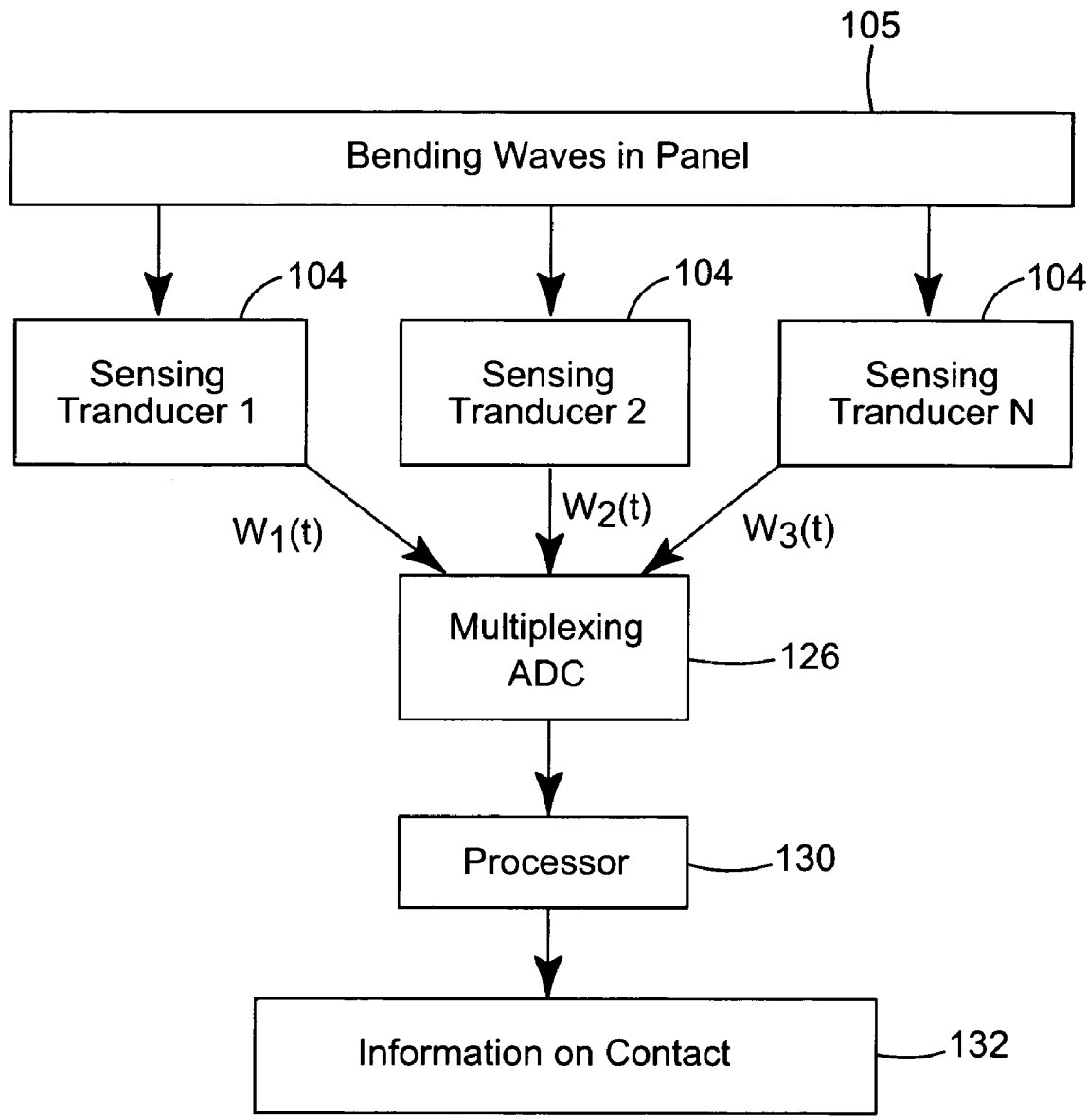
FIG. 8 illustrates an implementation for processing bending wave information obtained at each of a number of pickup sensors in accordance with an embodiment of the present invention.

For example, and with reference to FIG. 8, one implementation for processing of bending wave information sensed at each sensor 104 of FIG. 7 is illustrated. In FIG. 8, the bending waves in the panel 105 are sensed by at least three and preferably four sensors 104. The sensors 104 measure analog bending wave signals $W_1(t)$, $W_2(t)$ ... $W_N(t)$, which are transmitted to a multiplexing ADC 126. The resultant digital input signal is transmitted to a touch location processor 130 from which information 132 relating to the location and profile of the contact impulse is determined.

Figure 9:
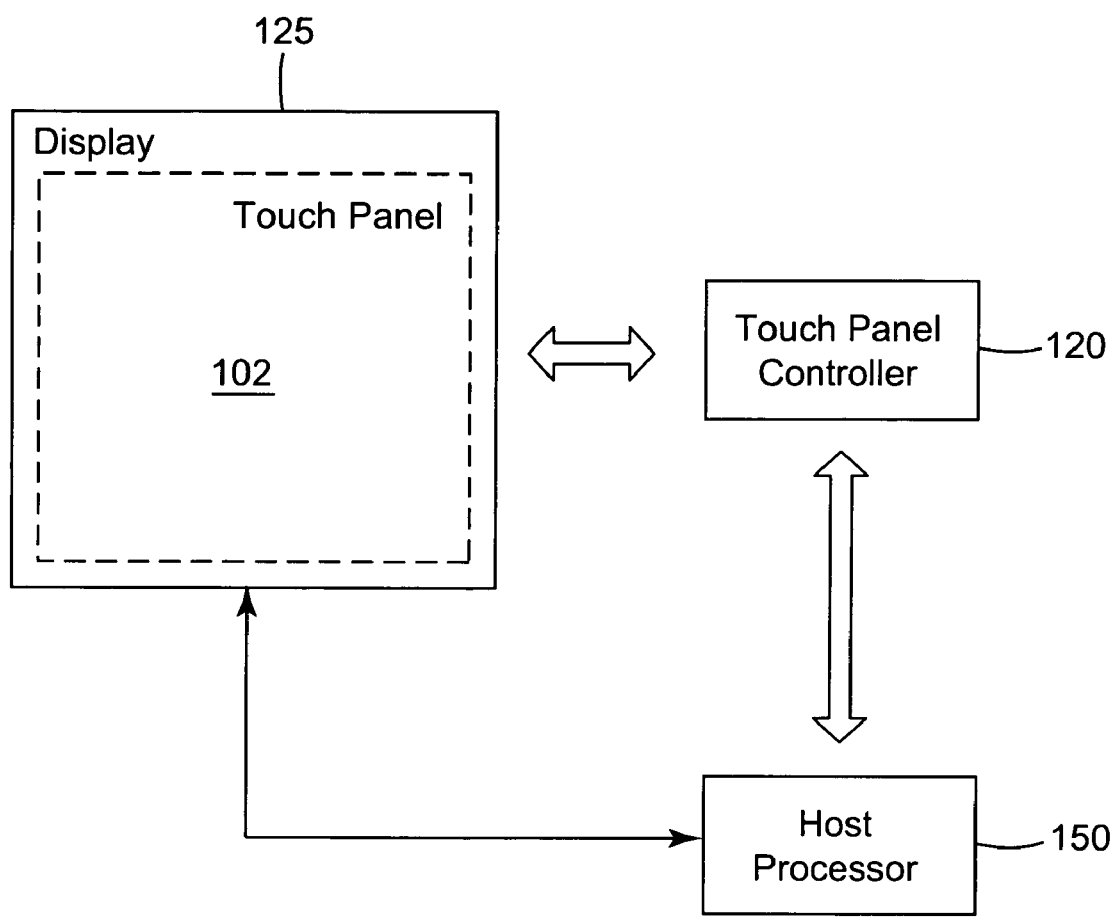
FIG. 9 illustrates a touch panel system that includes a touch sensitive device mounted to a display and coupled to a touch panel controller and host processor in accordance with an embodiment of the present invention.

As is further shown in FIG. 9, the touch panel controller 120 is typically coupled to a host processor 150. The host processor 150 is also coupled to a touch display system 125, which incorporates a touch sensitive device 102 of the type shown in FIG. 7. The host processor 150 may include a communications interface, such as a network interface, to facilitate communications between the touch panel system 100 and a remote system. Various touch panel system diagnostics, calibration, and maintenance routines, for example, may be implemented by cooperative communication between the touch panel system 100 and a remote system.

As shown in FIG. 7, the touch panel controller 120 may optionally include a wake-on-touch detector 140. In accordance with a general wake-on-touch approach, bending wave vibrations resulting from contact with, or otherwise imparted to, a substrate of a touch sensitive device are sensed. The sensed vibrations are analyzed or evaluated to determine if the sensed vibrations are the result of an intended touch by the user or an unintended touch to the touch sensitive device. In response to determining that the touch to the touch sensitive device was intentional, a wake-up signal is generated. If, however, it is determined that the touch to the touch sensitive device was unintentional, a wake-up signal is not generated.

The term "intended touch" refers to detectable vibrations, events causing such vibrations, and signals created due to sensors receiving such vibrations, that are intended to be interpreted as a touch input. The term "unintended touch" refers to detectable vibrations, events causing such vibrations, and signals created due to sensors receiving such vibrations, that are not intended to be interpreted as a touch input. Examples of an unintended touch include external noise as well as vibration-causing impacts to the touch sensitive device that do not produce a requisite signature in the detected signal. Details concerning various wake-on-touch approaches that may be implanted in the context of the present invention are disclosed in previously incorporated U.S. patent application Ser. No. 10/683,342.

Figure 10:
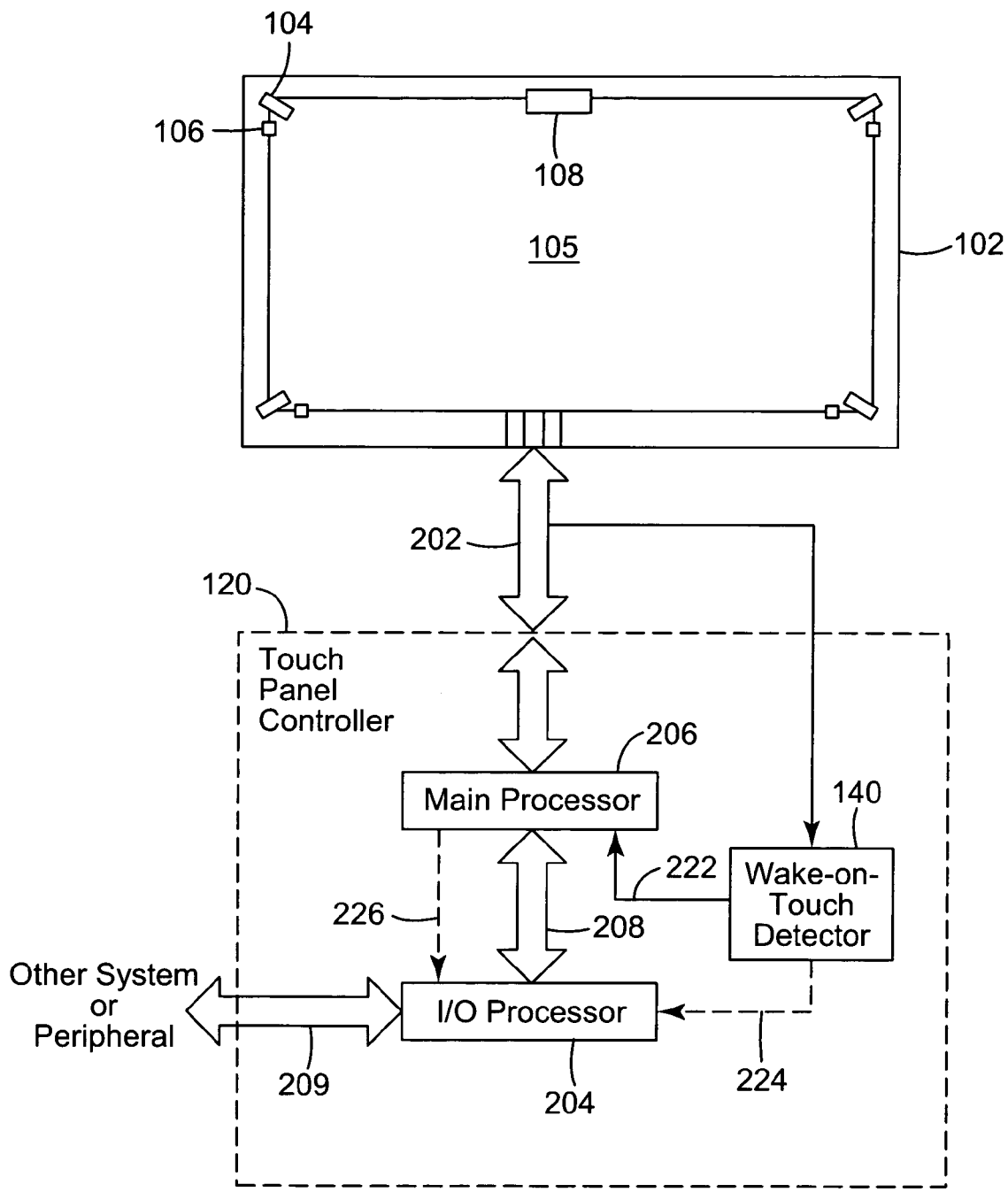
FIG. 10 shows an embodiment of a touch panel controller communicatively coupled to a touch sensitive device in accordance with the present invention.

FIG. 10 shows an embodiment of a touch panel controller 120 communicatively coupled to a touch sensitive device 102. According to this embodiment, touch panel controller 120 includes an I/O processor 204 coupled to main processor 206 via a bus 208. The I/O processor 204 is employed in this embodiment to manage I/O signalling between the touch panel controller 120 and an external system or device via bus 209.

In one configuration, I/O processor 204 is implemented to manage signalling over a high-speed interface 209, such as a serial interface or bus. By way of example, bus 209 may conform to a high-speed serial bus architecture, such as a USB (Universal Serial Bus) or IEEE 1394 Fire Wire architecture, and I/O processor 204 can be implemented to coordinate signalling over serial bus 209. Configuring bus 209 in accordance with a USB or Fire Wire specification offers instant plug and play connectivity. As such, touch panel controller 120 can be plugged into, and unplugged from, different ports at any time with no adverse consequence regarding connectivity.

As is shown in FIG. 10, wake-on-touch detector 140 is coupled to the I/O processor 204, interface 202, and optionally to main processor 206. In another configuration, wake-on-touch detector 140 can be coupled to the front end of the I/O processor 204 or be incorporated as an interface between I/O processor 204 and bus 202. The wake-on-touch detector 140 is preferably configured to receive sense signals from the touch sensitive device 102 yet not adversely affect transmission of sense signals and other signals or data between the touch sensitive device 102 and touch panel controller 120.

According to one configuration depicted in FIG. 10, wake-on-touch detector 140 can be coupled to the I/O processor 204, such that a wake-up signal generated by wake-on-touch detector 140 is transmitted to I/O processor 204 via line 222. In this configuration, the I/O processor transitions from a sleep mode to an active mode in response to the wake-up signal. After transitioning from sleep to active mode, the I/O processor 204 may determine whether other components require activation, such as the main processor 206 or other components of the touch panel controller 120 and/or control system of the portable device incorporating the touch sensitive device 102. Alternatively, the I/O processor 204 may generate a secondary wake-up signal that is transmitted via line 226 to the main processor 206 via bus 208. In another configuration, wake-on-touch detector 140 can generate a wake-up signal and transmit the wake-up signal to both I/O processor 204 (via line 222) and main processor 206 (via line 224).

In the configuration of the touch sensitive device 102 shown in FIG. 10, each of the sensors 104 is coupled to a buffer circuit 106. Because the buffer circuits 106 have active components (e.g., JFET), power must be supplied to the buffer circuits 106 when active. As such, the sensors 104 are poor candidates for wake-on-touch sensors in applications where power conservation is an issue. The emitter transducer 108, however, is not coupled to a buffer circuit 106, making the emitter transducer 108 a good candidate for a wake-on-touch sensor.

It is readily appreciated that a wake-on-touch methodology according to this embodiment can significantly reduce power consumption of touch sensitive devices, particularly portable and hand-held touch input devices. For example, each of main processor 206 and I/O processor 204 can require several hundred milliamps of current during normal operation. With the use of wake-on-touch detection using the emitter transducer 108, most of the circuitry of main processor 206 and I/O processor 204 can be turned off in sleep mode, thereby appreciably reducing power requirements to a small fraction of that required for full operations.

Figure 11:
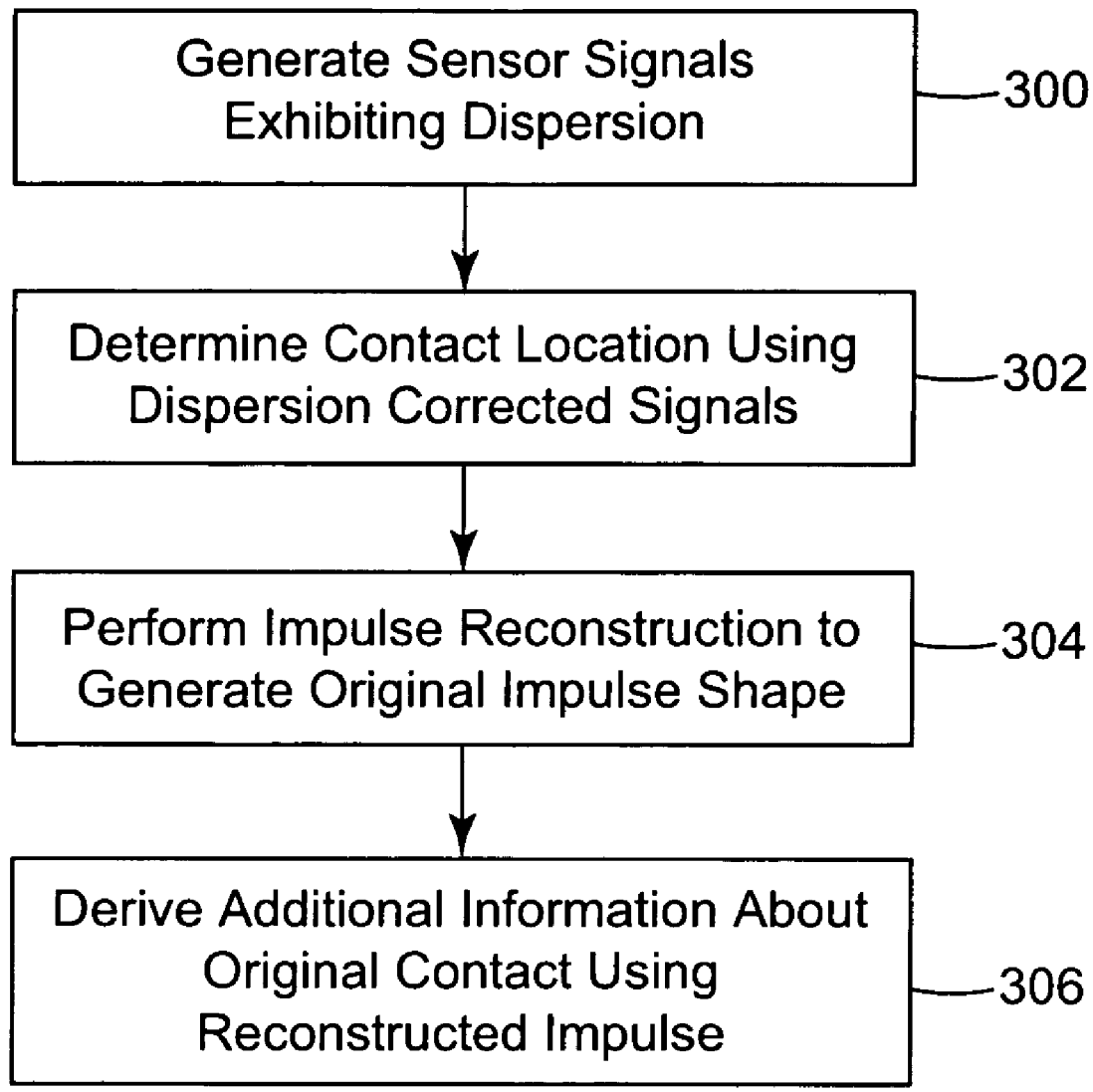
FIG. 11 illustrates a method employing impulse reconstruction in accordance with an embodiment of the present invention.

Referring now to FIG. 11, there is illustrated various processes involving impulse reconstruction in accordance with the principles of the present invention. The term "impulse reconstruction" as used herein refers to a process of generating the shape and/or other defining characteristics of the original impulse generated by contact to a touch sensitive substrate. The methodology depicted in FIG. 11 and in subsequent Figures may be implemented in a variety of touch sensitive device configurations, such as those described above.

According to FIG. 11, pickup sensor signals are generated 300 in response to a contact to a touch sensitive plate. The location of the contact on the touch sensitive plate is determined 302, preferably by a method that provides for dispersion correction of the pickup sensor signals. Once the touch location is known, impulse reconstruction is performed 304 to effectively reproduce the original shape of the impulse generated by the contact. The reconstructed impulse may then be used for a variety of purposes, including deriving 306 additional information about the original contact event.

Figure 12:
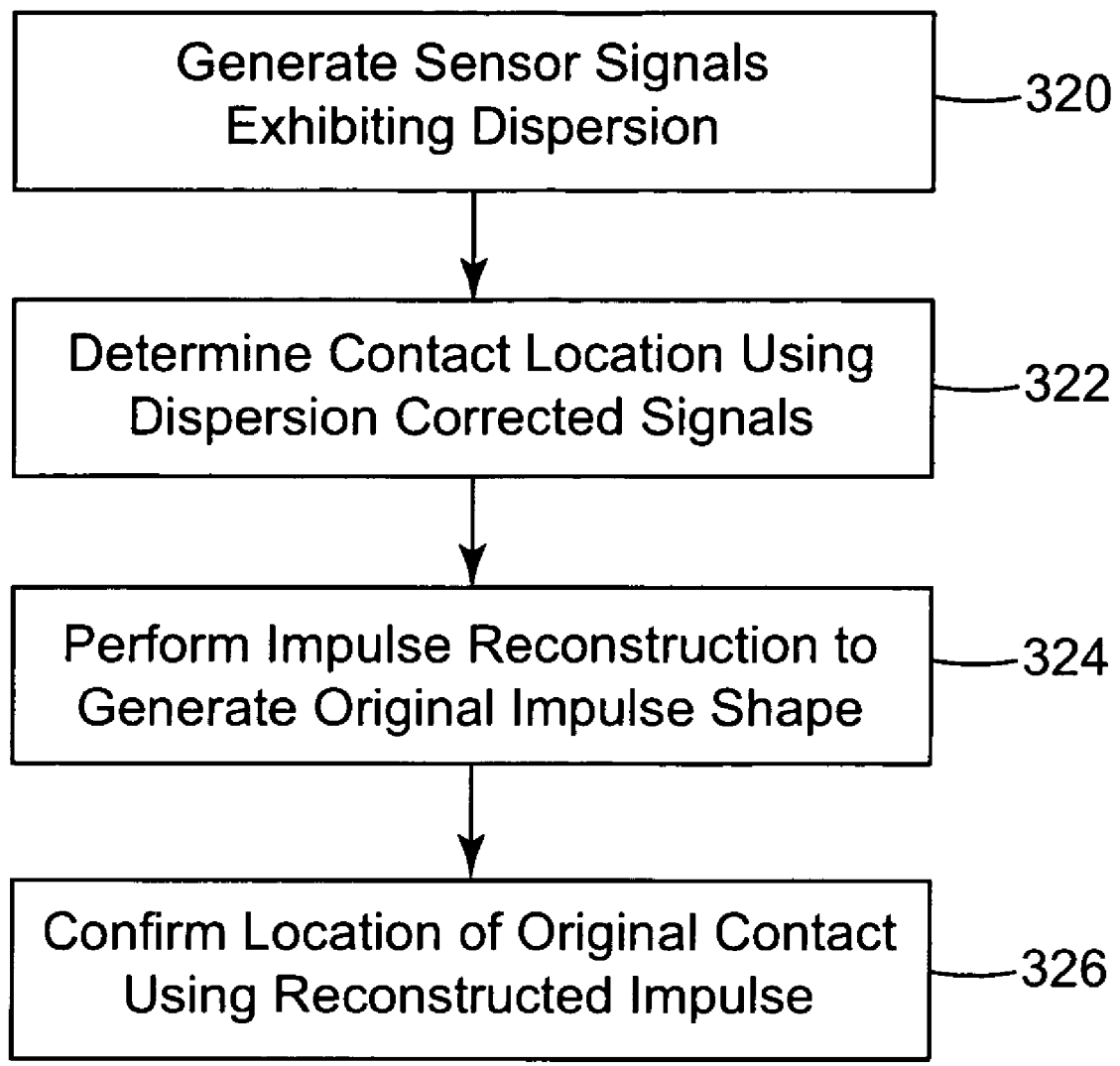
FIG. 12 illustrates a method employing impulse reconstruction and touch location confirmation in accordance with an embodiment of the present invention.

FIG. 12 illustrates a particularly useful method involving impulse reconstruction in accordance with an embodiment of the present invention. In FIG. 12, pickup sensor signals are generated 320 in response to a contact to a touch sensitive plate, and the location of the contact on the touch sensitive plate is determined 322. Having determined the touch location, impulse reconstruction is performed 324 to generate the original shape of the impulse. The reconstructed impulse is then used to confirm or verify 326 the location of the original contact.

As discussed previously, touch location confirmation using impulse reconstruction may be employed to achieve a variety of performance enhancements, including, for example, improved rejection of spurious touches to the casing or support structure of a touch sensitive device, improved contact strength determinations, improved accuracy in determining touch location in the presence of ambiguity or noise, improved identification of contact implement type and related properties, and improved rejection of spurious contact data generated by background acoustic noise, among others.

Figure 13:
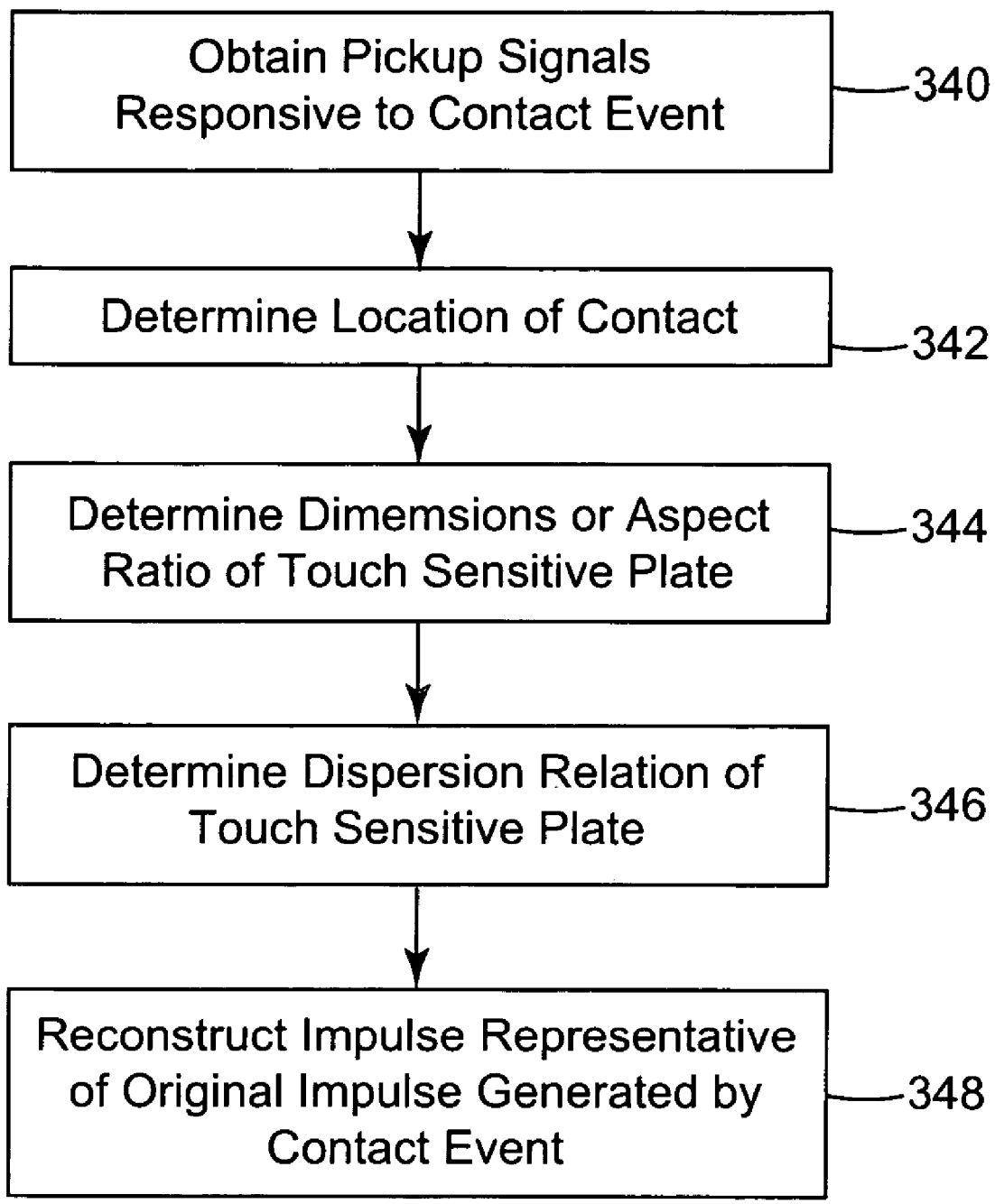
FIG. 13 illustrates a method of performing impulse reconstruction in accordance with an embodiment of the present invention.

FIG. 13 illustrates another method involving impulse reconstruction in accordance with an embodiment of the present invention. According to this approach, pickup sensor signals are obtained 340 in response to a contact event that generates an original impulse on a touch sensitive plate. The location of the contact is determined 342 preferably in a manner previously described. The dimensions or aspect ratio of the touch sensitive plate are/is determined 344. The dispersion relation of the touch sensitive plate is either determined or known 346. Using the information obtained in blocks 340-346, the impulse representative of the original impulse is reconstructed 348.

According to one approach to determining the dimensions of a touch sensitive plate, indicated in block 344, a dedicated excitation transducer may be used to generate bending waves that are sensed by the pickup sensors positioned in the corners of the touch sensitive plate. The excitation stimulus may be either a pulsed stimulus or a wide band noise-like stimulus. The pickup signals output by the pickup sensors may be processed in a dispersive manner, such as by the conversion of each of the pickup signals to one of an equivalent non-dispersive system. The relative distance from the excitation transducer to each of the pickup sensors is computed. An alternative approach for determining relative distance between the excitation transducer and pickup sensors involves the removal of a fixed amount of dispersion for the investigation of first arrival times. In another alternative approach, the excitation signals may be focused on a narrow frequency band and relative arrival times to each of the pickup sensors may be estimated.

If the absolute dispersion relation of the touch sensitive plate is known or determined by direct measurement, the absolute dimensions of the plate may be computed. If the absolute dispersion relation of the touch sensitive plate is not known, only the relative dimensions of the touch plate may be computed. The absolute dispersion constant of the material of the touch sensitive plate is required to determine the absolute dimensions of the plate since the material properties of the plate determine the absolute velocity of wave propagation across the plate as a function of frequency. Without this knowledge, the touch sensitive plate dimensions are only known in normalized coordinates. Details of various methodologies directed to plate calibration and determining the dispersion relation of a touch sensitive plate, as indicated in blocks 344 and 346 of FIG. 13, are described in previously incorporated co-pending U.S. patent application Ser. No. 10/750,502 entitled "Touch Sensitive Device Employing Bending Wave Vibration Sensing and Excitation Transducers," filed concurrently herewith.

It is understood that an impulse on a touch sensitive plate propagates outwardly from the contact location in a circular manner according to the following equation:

$$\psi(r, t) = \frac{\psi(0, t) \cdot e^{i(kr-\alpha t)}}{\sqrt{r}}$$

where, $\Psi$ corresponds to a physical parameter such as displacement or velocity, $\omega$ is angular velocity, k is wavevector in the touch sensitive plate, and r is the distance from the contact location to the sensing position. The wavevector, k, in the touch sensitive plate is related to the angular velocity, $\omega$, by the following dispersion relation:

$$k(\omega) = \sqrt{\omega \sqrt{\frac{\mu}{B}}}$$

where, $\mu$ refers to the areal density of the touch sensitive plate and B refers to the bending stiffness of the plate. It is noted that, for purposes of clarity, the above equations represent a simplification of the full plate equations, which are more complex due to the presence of flexural near fields.

From the above equations, it can be seen that the amplitude of the impulse decays with distance, as required by conservation of energy. In addition, a phase factor is applied to the impulse that depends on distance. This phase factor has a square root dependence on frequency and, therefore, gives rise to a change in the impulse shape as picked up at the sensor position (in contrast, a pure delay, with no associated change in impulse shape, has a linear dependence on frequency). This is the well-known effect of dispersion of the propagation of bending waves.

Various approaches to performing dispersion correction, where a dispersive signal is transformed to a signal propagating in a non-dispersive medium, have been discussed above. A property of these transformation methods, which is beneficial for the efficient calculation of contact location, is the compensation for the dispersive effects for all time.

However, a simpler transformation may be employed for impulse reconstruction in accordance with the present invention. According to one such simpler transformation, a fixed amount of dispersion is removed from the dispersive sensor signals. Given the location of the contact to the touch sensitive plate, the dispersion of the impulse can be readily understood from the above equations. With the application of an inverse phase factor, corresponding to the contact/sensor separation, the initial signal picked up by each sensor may be compensated and the original impulse reconstructed. It is noted that later energy, associated with reflections/reverberation, will retain a dispersive property.

This simpler transformation approach is not directly suitable for determining the location of a contact event, since the dispersion removal process requires prior knowledge of the contact location. It is noted that an iterative procedure based on first arrivals and fixed amount of dispersion removal may be implemented, although this is likely to be less computationally efficient than a true dispersion correction transform. However, given the location of the contact from another method, such as a dispersion corrected correlation function, the reconstruction of the original impulse provides a number of benefits for an improved touch sensitive device.

Figure 14:
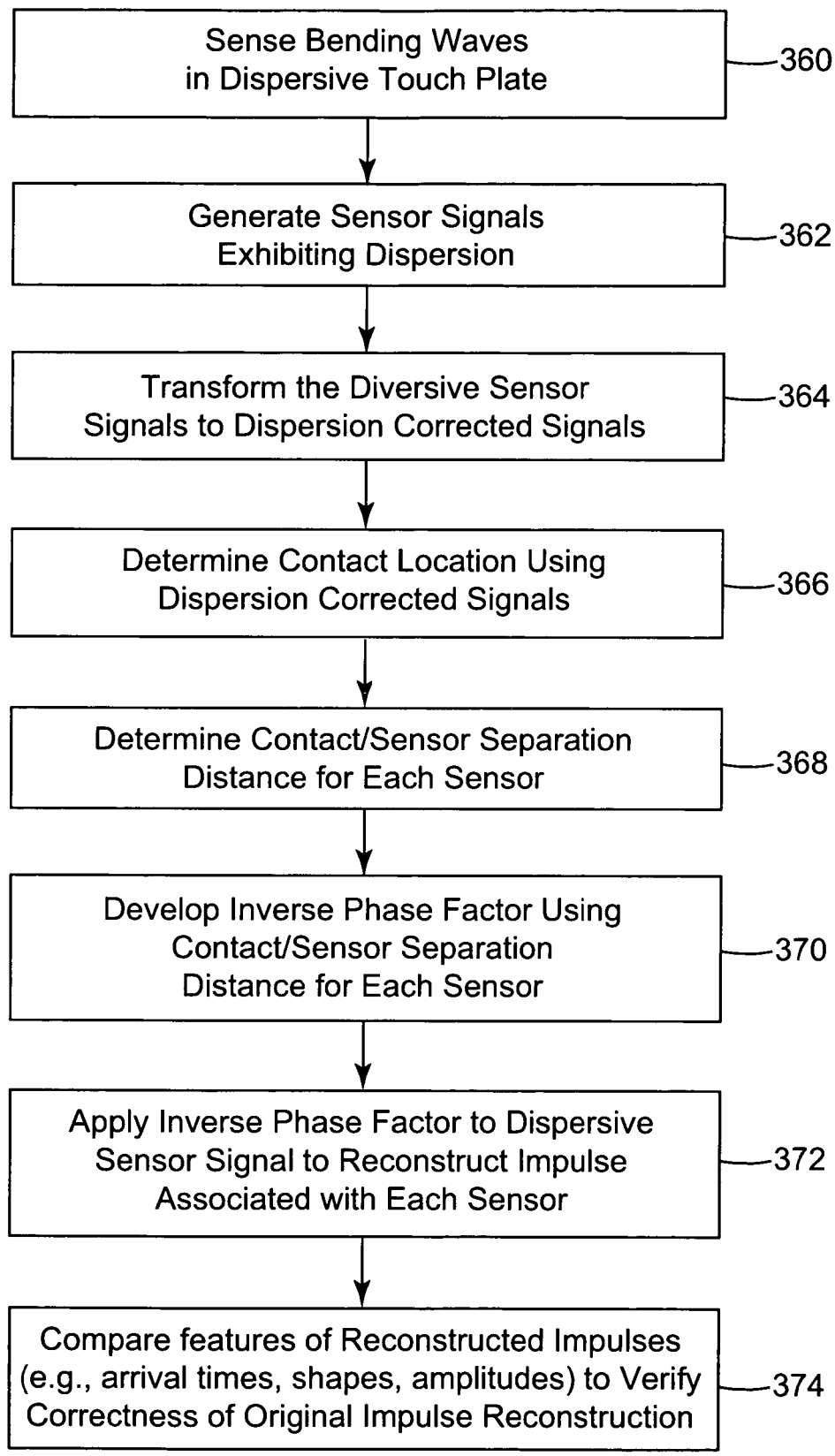
FIG. 14 illustrates a method of performing impulse reconstruction and touch location confirmation in accordance with an embodiment of the present invention.

FIG. 14 illustrates a method involving use of an inverse phase factor as part of impulse reconstruction in accordance with an embodiment of the present invention. According to the approach shown in FIG. 14, bending waves propagating in a dispersive touch sensitive plate are sensed 360, from which sensor signals exhibiting dispersion are generated 362. The dispersive sensor signals are transformed to dispersion corrected signals 364. Using the dispersion corrected signals, the location of contact to the touch sensitive plate is determined 366. The separation distance between each pickup sensor and the contact location is determined 368.

For each pickup sensor, an inverse phase factor is developed 370 using the respective contact/sensor separation distances. The inverse phase factor is applied 372 to the dispersive sensor signal to reconstruct the impulse 372 sensed by each of the pickup sensors. One or more features of the reconstructed impulses, such as arrival time, shape, amplitude, or other morphological feature, are compared to verify that the contact location computed in block 366 is correct.

Figure 15:
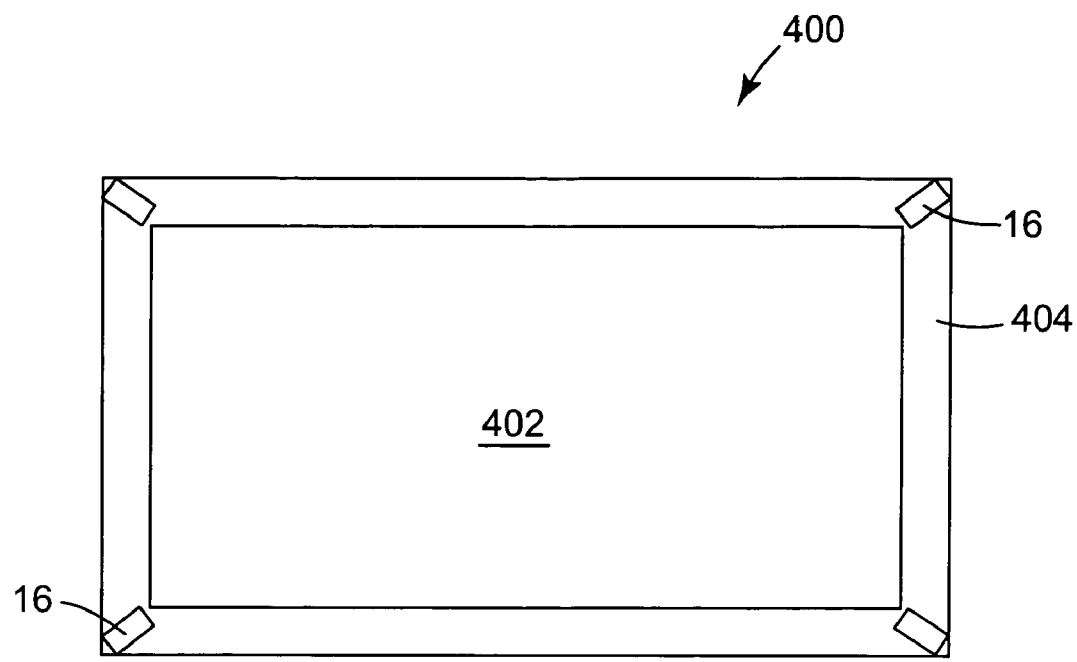
FIG. 15 shows a touch sensitive device with which methodologies involving impulse reconstruction and touch location verification may be implemented in accordance with embodiments of the present invention.

For purposes of illustrating additional features of the present invention, reference is made to the bending wave touch sensitive device 400 shown in FIG. 15. According to this embodiment, a touch sensitive panel 402 is mounted into a frame 404 of an LCD monitor, with a front bezel and a rear housing made from a plastic molding. Mounted at each corner of the touch sensitive panel 402 is a pickup sensor 16. The following discussion of FIGS. 16-32 assumes that the methodologies associated with these Figures may be implemented in a touch sensitive device 400 of the type generally depicted in FIG. 15.

Figure 16:
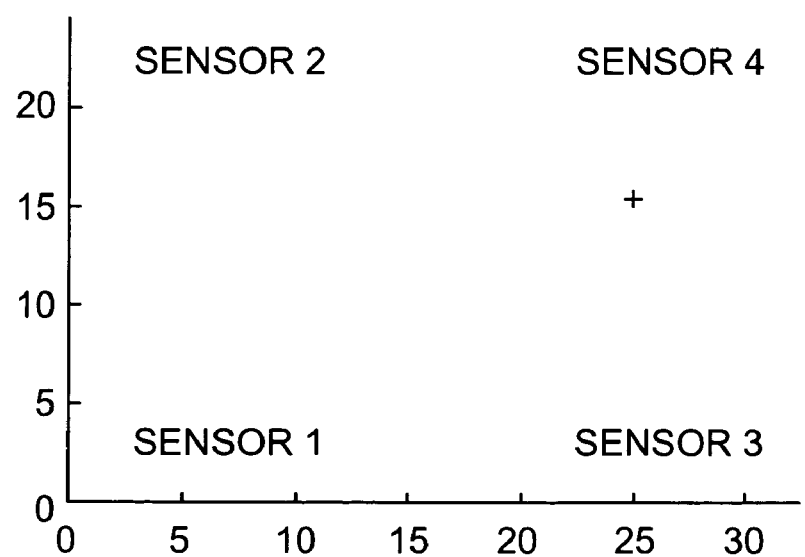
FIG. 16 is a graphical representation of a touch sensitive plate with dimensions indicated and a maker indicating the location of contact to the plate by a finger.

FIG. 16 shows a plot of the touch sensitive panel area, with axis units of centimeters. The designations of the sensor numbers in each corner are indicated. In addition, a cross (plus sign) indicates the location of a contact that was generated by a finger touch on the panel. This contact generated a transient pulse of bending waves, which was converted to a voltage by each of the pickup sensors. The sensor signals were then pre-amplified, digitized, and high pass filtered at 10 kHz, resulting in the traces shown in FIG. 17. It is noted that all such graphs have y-axis units that are arbitrary, and x-axis units of sample number, taken at a 100 kHz sample rate.

Figure 17:
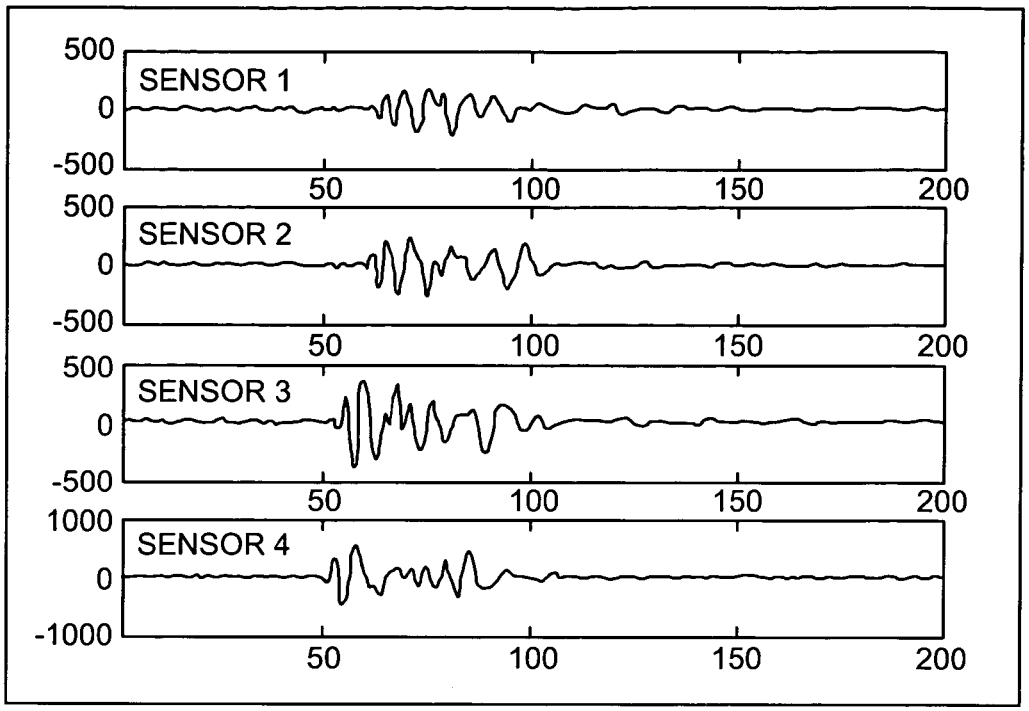
FIG. 17 shows traces of pickup signals for four sensors responsive to the contact shown in FIG. 16.

The dispersion of the traces shown in FIG. 17 is clear. In particular, the sensors furthest from the contact location (i.e., sensors 1 and 2) show later arrival of energy and a more spread out impulse shape. When the inverse phase factor associated with the contact/sensor separation is applied to the raw sensor signal data of FIG. 17, the traces in FIG. 18 result.

Figure 18:
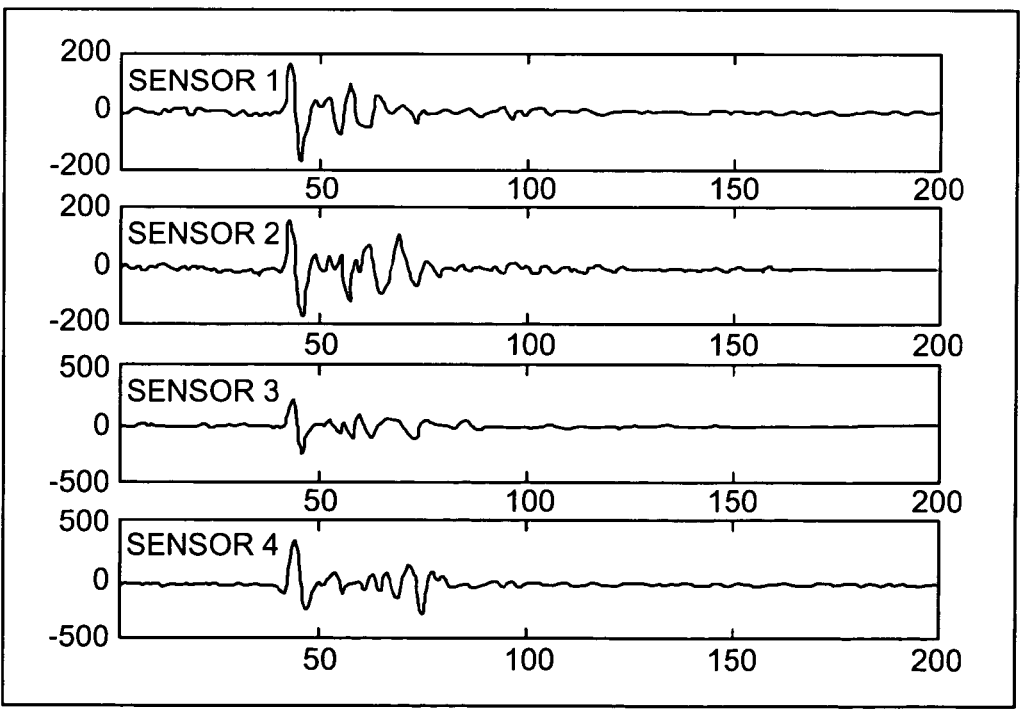
FIG. 18 shows traces of impulse reconstructed data corresponding to the raw data shown in FIG. 17.

Whereas the dispersed traces shown in FIG. 17 exhibit different shapes and arrival times, the traces shown in FIG. 18 have a similar shapes (i.e., all have a positive going initial transient) and are time aligned. These traces demonstrate the correct reconstruction of the initial impulse. Techniques for determining impulse similarity between reconstructed impulses will be discussed in greater detail below.

The dispersion of the contact impulse may be viewed as a spatial filter, in that the signal at each sensor is filtered differently for every point on the touch sensitive plate. As previously discussed, the process of impulse reconstruction may be thought of as the application of an inverse filter for the first arrival energy, and may be implemented to verify that the contact location, as determined by the location determination algorithm, is consistent with the original pickup signals.

Figure 19:
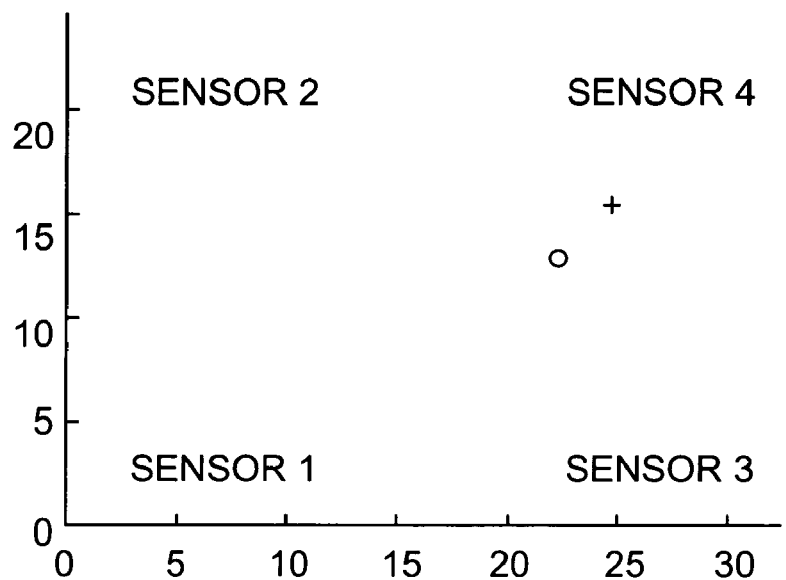
FIG. 19 shows the touch sensitive plate of FIG. 16 with the addition of a marker indicating a shifted contact location for purposes of simulating an error.

By way of example, FIG. 19 shows the original contact location, as shown in FIG. 16, together with a position shifted 25 mm in both x- and y-directions. This illustrative example simulates an error, where the point location is reported away from the true location.

Figure 20:
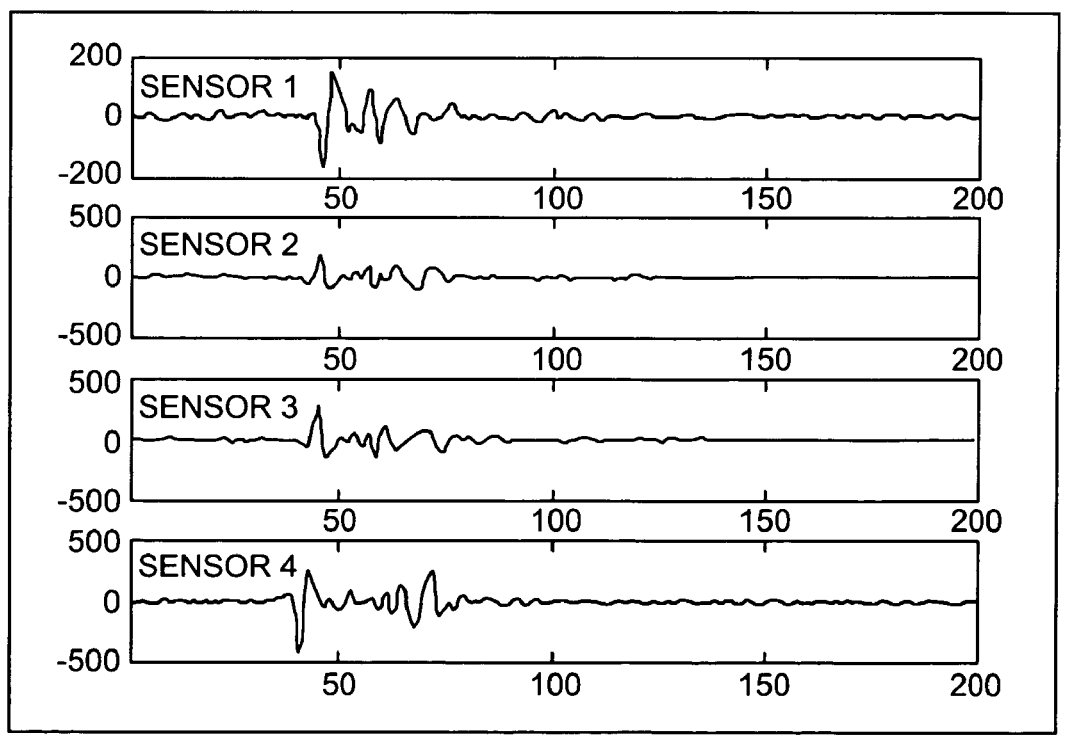
FIG. 20 shows traces of the four pickup signals implicated in FIG. 19 that have been subject to impulse reconstruction and touch location verification in accordance with the present invention, the reconstructed impulses verifying the error simulated in FIG. 19.

Impulse reconstruction is performed on the pickup signals, as shown in FIG. 17, but with the shifted location position. The results are shown in FIG. 20. It is clear that the reconstruction of the original impulse is no longer accurate, with significant variation between the different signals being evident. This spurious point may readily be detected and reported as being erroneous.

The verification of point location provided by a method of impulse reconstruction according to the present invention provides for enhanced functionality. For example, where an error in the calculation results, impulse reconstruction may be used to highlight the error and return no point. The return of no point rather than a point in error is considered preferable. By way of further example, reflections from panel edges may generate additional peaks in a dispersion corrected correlation function. These may give rise to ambiguity and a number of candidate points. These ambiguities may readily be resolved using an impulse reconstruction and contact location verification methodology of the present invention.

In another example, lowering a threshold for triggering the location determination calculation may give rise to spurious points due to transients in the background noise, such as airborne acoustic, structural acoustic, or electrical noise, for example. These noise related spurious points may be rejected by use of impulse reconstruction, allowing a lower threshold to be set and achieving greater sensitivity to light touches.

Figure 21:
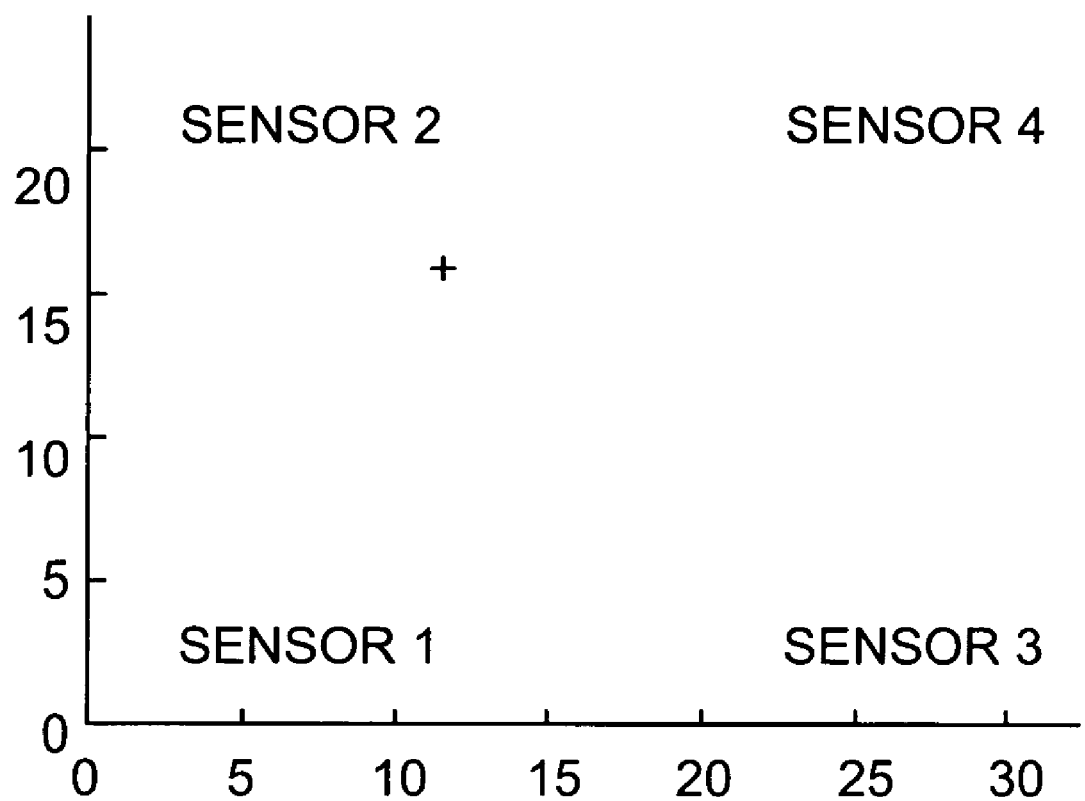
FIG. 21 shows a touch sensitive plate mounted to an LCD assembly, and a marker indicating a false point returned by the touch location determination algorithm resulting from a touch to the bezel of the LCD assembly.

The following illustrative example involves a touch on the LCD bezel. In this case, a touch to the bezel couples energy into the touch sensitive panel, triggering the location determination calculation. A point may be reported within the body of the touch sensitive plate that requires verification using impulse reconstruction. FIG. 21 shows the point (represented by a cross) reported by a touch to the LCD bezel.

Figure 22:
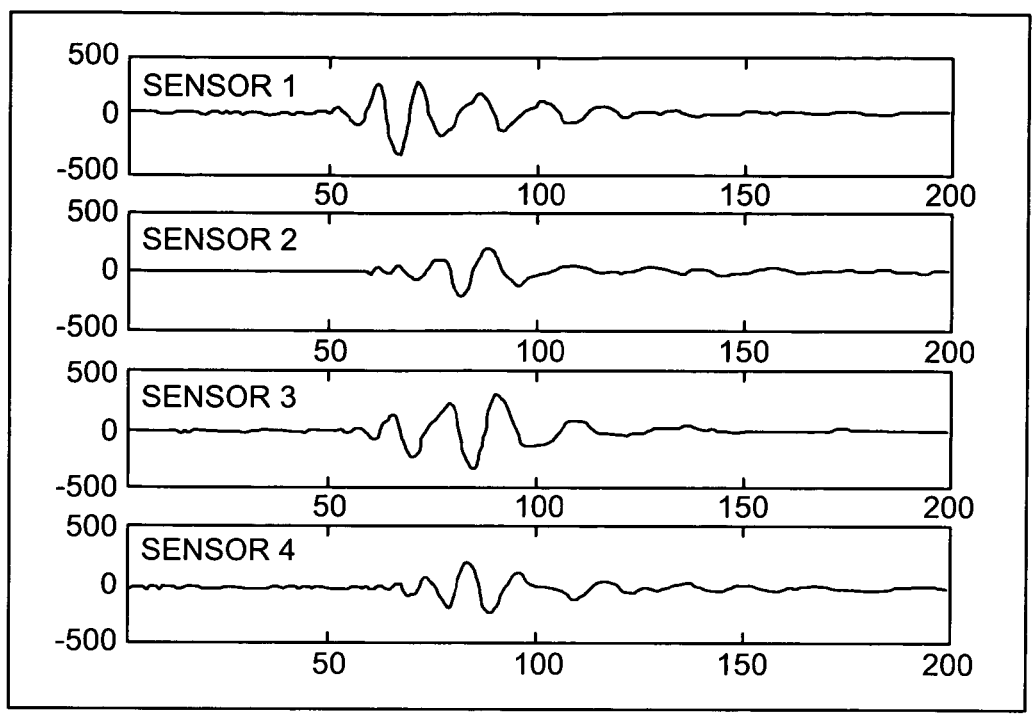
FIGS. 22 and 23 show traces of pickup signals and reconstructed impulses, respectively, resulting from the bezel touch event depicted in FIG. 21.
Figure 23:
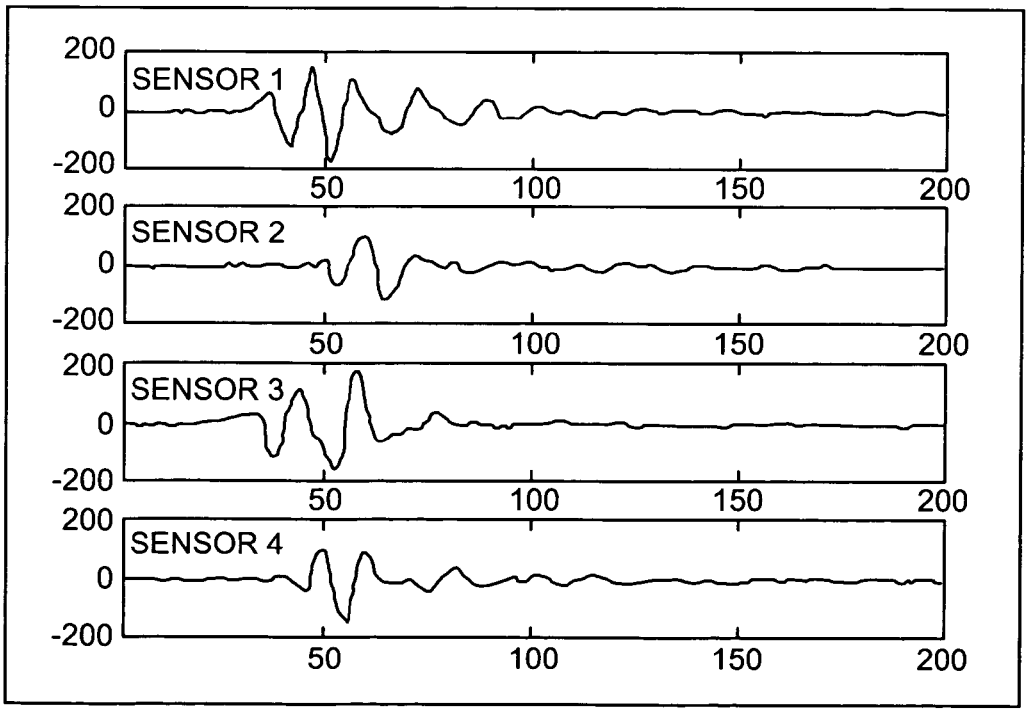

FIG. 22 shows the pickup signal traces resulting from the tap to the LCD bezel. These signal traces show different arrival times and dispersed shapes. Given the traces shown in FIG. 22, it is not immediately obvious whether these traces resulted from a bezel touch or a valid contact to the touch sensitive panel. FIG. 23, however, shows the result of impulse reconstruction applied to the traces of FIG. 22. It is clear from the traces in FIG. 23 that the reconstructed impulse shapes do not correspond to a valid point. As such, this erroneous point may be readily rejected.

Figure 24:
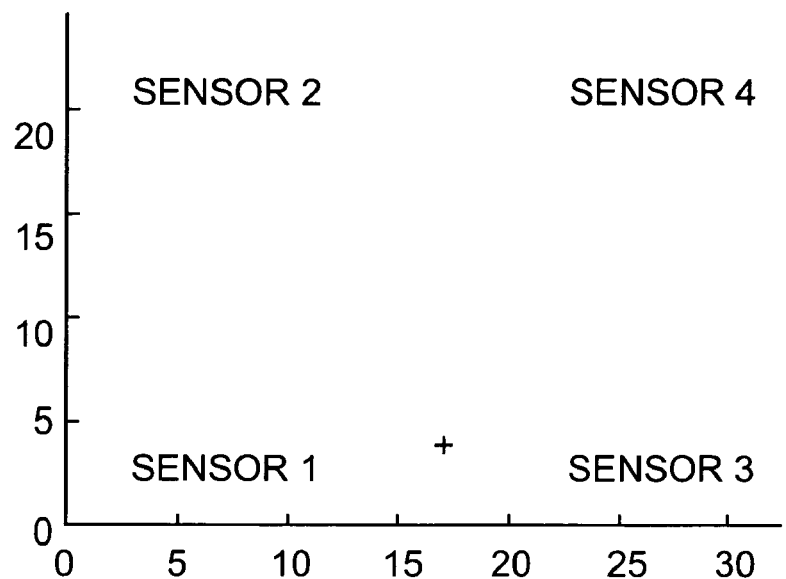
FIGS. 24, 25, and 26 show touch contact location, pickup signals, and reconstructed impulses, respectively, resulting from a touch event with a stylus.
Figure 25:
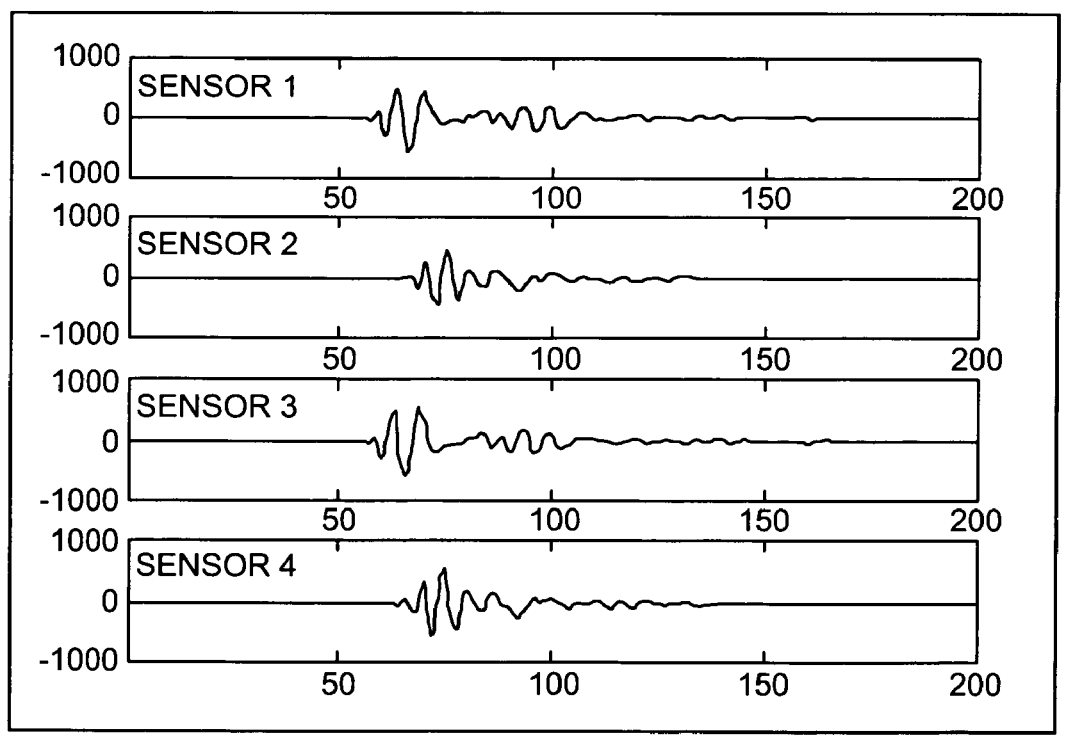
Figure 26:
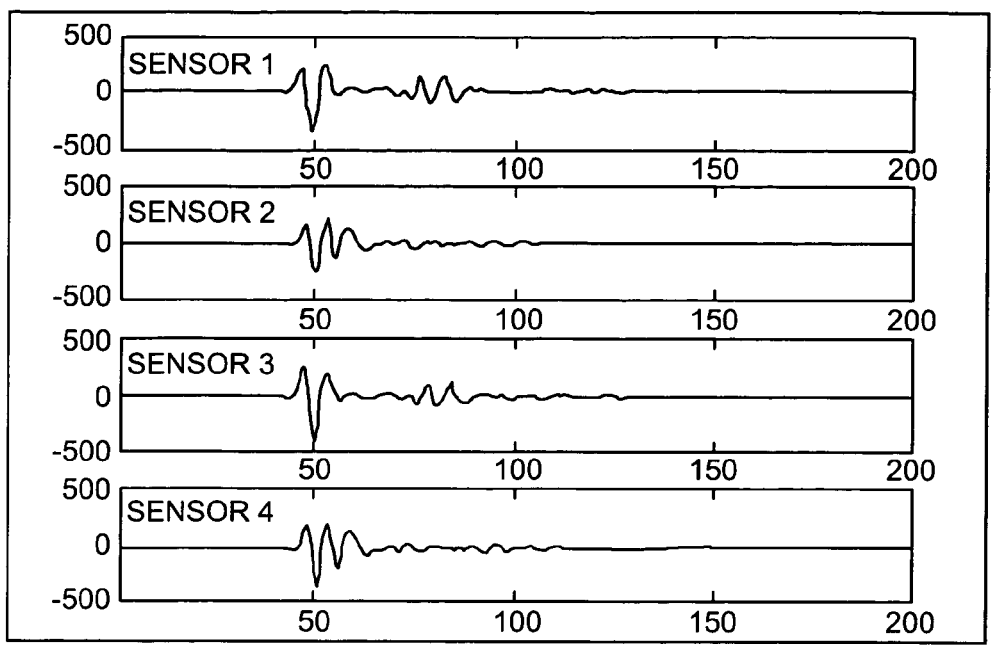

FIGS. 24, 25, and 26 show the contact location, pickup signals, and reconstructed impulses resulting from a touch event with a stylus. It can be readily seen from the traces shown in FIG. 26 that the impulse reconstruction worked very well. The impulse shape generated by use of a stylus is quite different from that generated by a figure contact. Such differences may be used to detect the nature of the contact type, e.g., finger vs. stylus vs. gloved finger, etc.

Impulse reconstruction as applied to contact location confirmation has been well described above, with examples showing how similar reconstructed impulses may be obtained from each sensor. The process of confirming contact point validity involves a measure of the similarity, both in time of arrival and shape, of each of the reconstructed impulses. A number of techniques may be implemented for this purpose, including measures of correlation between the different reconstructed impulses. The method described below with reference to FIGS. 27(a)-(d) represents one of several techniques that performs well and is computationally efficient.

Figure 27A:
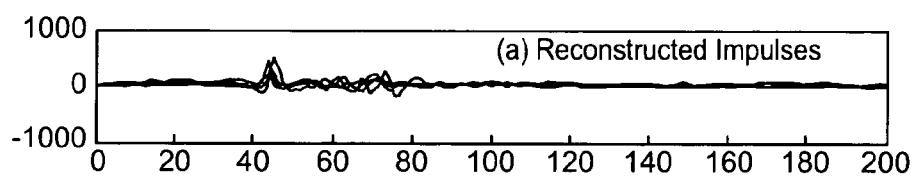
FIG. 27 illustrates a measurement of impulse synchronicity as applied to the data shown in FIG. 18 in accordance with an embodiment of the present invention.
Figure 27B:
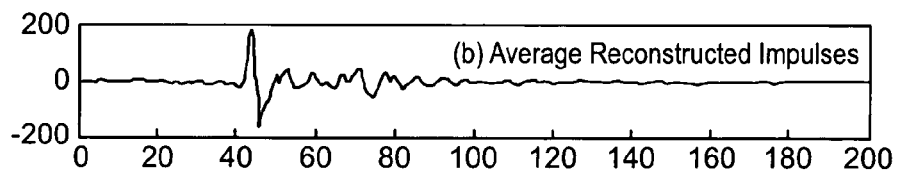

FIG. 27(a) shows the reconstructed impulses as originally shown in FIG. 18 for sensors 14. FIG. 27(b) shows the average of these impulses. Taking the average of the reconstructed impulses serves to emphasize the desired similar feature in each trace, that the rise time and shape are similar for the four sensors. It is noted that the later energy results from reflections within the touch sensitive plate and is not corrected for dispersion by the impulse reconstruction process. In this regard, the impulse reconstruction process only attempts to correct for one distance, that being the first arrival distance. As a result, the later energy differs between the four traces and is therefore reduced by the averaging process. The trace shown in FIG. 27(b) therefore combines the information in the four traces in a beneficial manner.

Figure 27C:
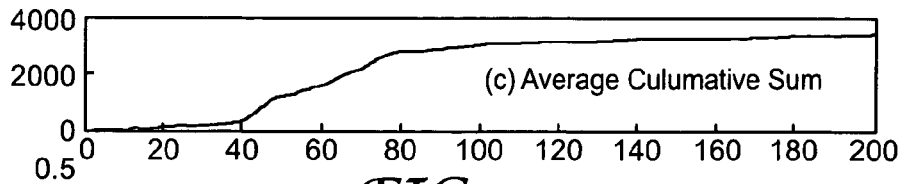

In order to further emphasize the sharp change that is clearly visible in FIG. 27(b), a scaling factor can be usefully applied. Such a scaling factor is shown in FIG. 27(c), which is derived from the cumulative sum of the absolute value of the impulse response. This is calculated for each sensor and averaged to give the trace shown in FIG. 27(c). The resulting trace is low when the signal is quiet but progressively increases as time increases through the non-quite portion of the impulse. This approach may be used to emphasize the first arrival as shown in FIG. 27(d).

Figure 27D:
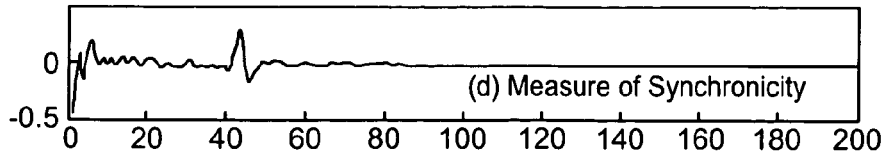

FIG. 27(d) shows the average impulse response divided by the average cumulative sum, i.e., the trace of FIG. 27(b) divided by the trace of FIG. 27(c). This scaling serves to normalize the trace and emphasize the start of the impulse close to sample 40. The initial 20 samples of the response show some noise that results from the large value of the scaling function. However, after the first 20 samples are discarded, the measure may be used as an indicator of impulse synchronicity. Also shown on the graph of FIG. 27(d) is a threshold level of 0.2, above which the impulses are considered synchronous and the point valid.

A measure of synchronicity has been shown with reference to FIG. 27 that emphasizes similar shapes of impulses all starting sharply around the same time. This measure may be used to confirm valid points and reject erroneous points.

Figure 28:
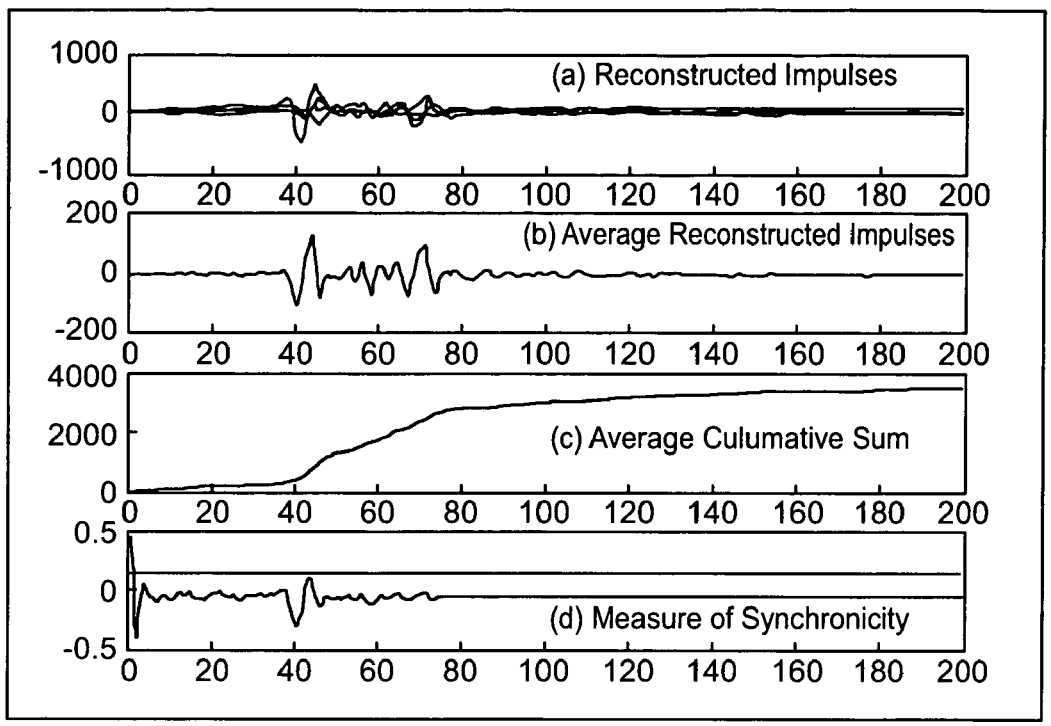
FIG. 28 illustrates a measurement of impulse synchronicity as applied to the data shown in FIG. 20, when the reported touch is inaccurate, in accordance with an embodiment of the present invention.
Figure 29:
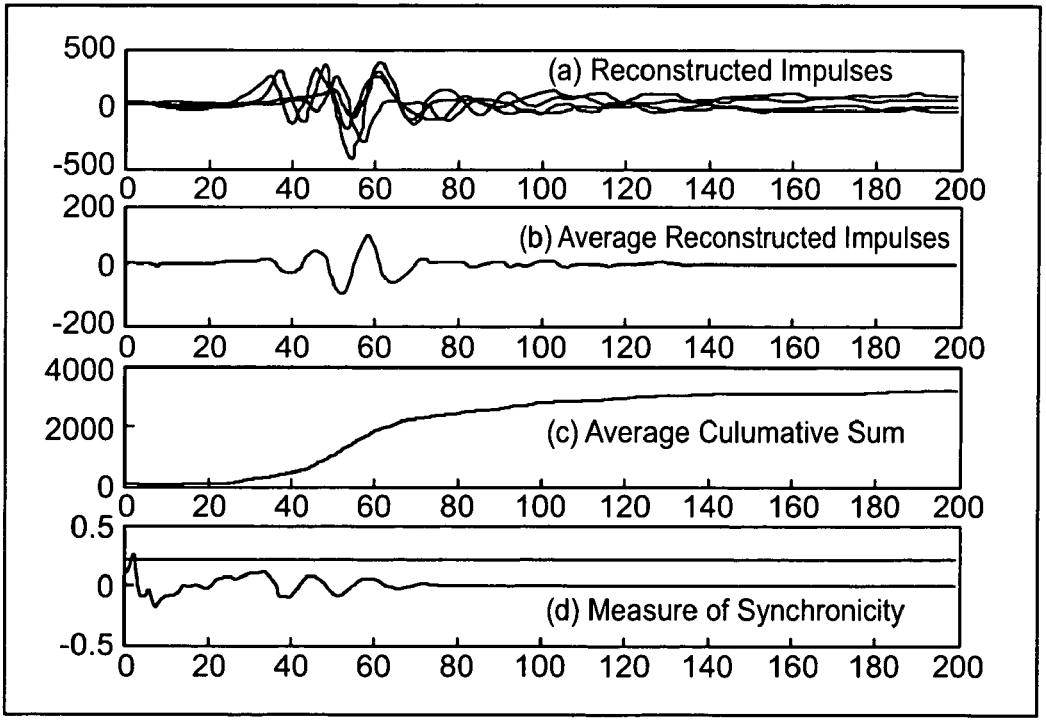
FIG. 29 illustrates a measurement of impulse synchronicity as applied to the bezel touch data shown in FIG. 22 in accordance with an embodiment of the present invention.

In order for a given synchronicity measure to be valid, it should reject "bad" points. Two examples of such measures will now be discussed. The first, shown in FIG. 28, shows the results for the inaccurate data example, originally shown in FIG. 20. The second, shown in FIG. 29, shows the results for the LCD bezel touch data, originally shown in FIG. 22. Both "bad" point examples do not cross the threshold in the region of interest (e.g., after 20 samples), which demonstrates the efficacy of the synchronicity measure approach described above.

The method of impulse reconstruction as described above relies on the fact that the original contact does in fact produce a reasonable impulse. This is the case for most contacts and the method works well with application of the inverse phase factor associated with the first arrival distance to each sensor. However, there is the additional possibility of a constant phase factor in the measurement.

This may be caused by a number of different sources, including: (1) Bending waves in touch sensitive plates take the form of both propagating waves and exponentially decaying near fields. These near fields do not propagate from the contact point to the sensor, however they do influence the response at the contact point and may be out of phase with the propagating wave. With an impulse input at the contact point, the response of the plate may also be impulse-like, however the phase of the propagating wave may be shifted; (2) The contact may be compliant, introducing a phase factor in the force generated; (3) The phase of the response at the sensor location is influenced by the boundary conditions at the edge, in the vicinity of the sensor; and (4) The sensor transducer itself may be implemented to measure the response of different physical quantities. Examples include velocity, force, in-plane stress, and curvature. These physical parameters are not generally in-phase, and depending on which parameter is measured, different phase factors may be introduced.

The action of a phase factor is to change the shape of the reconstructed impulse. The resulting impulses are still time-aligned and similar in shape after reconstruction. However, their similarity to an impulse may be compromised by such an arbitrary phase factor. For this reason, the method of impulse reconstruction as described above may be extended to include correction for a constant phase in addition to the phase associated with the first arrival distance. This may be chosen to improve the sharpness of the reconstructed impulse shape.

Impulse reconstruction may be used for purposes other than for contact location confirmation. For example, impulse reconstruction may be employed to determine the strength (z-axis sensitivity) of touches to a touch sensitive plate. Z-axis sensitivity refers to the ability to detect the strength of a touch. To some extent, this is possible with the raw pickup signals. Course differentiation of a hard versus soft contact may be achieved by comparison of the voltage levels generated. For example, a hard contact will generate a larger RMS voltage level than a soft contact.

Figure 30:
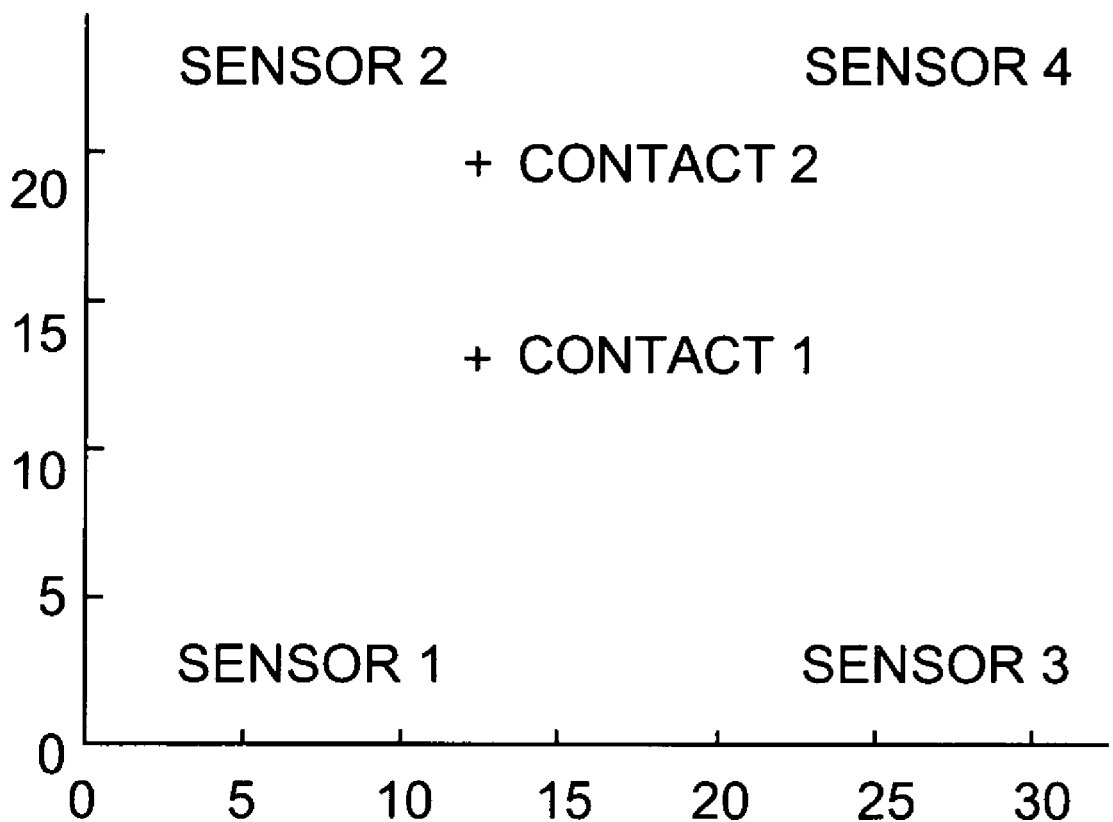
FIG. 30 shows a touch sensitive plate and the location of two contacts of different strength.
Figure 31:
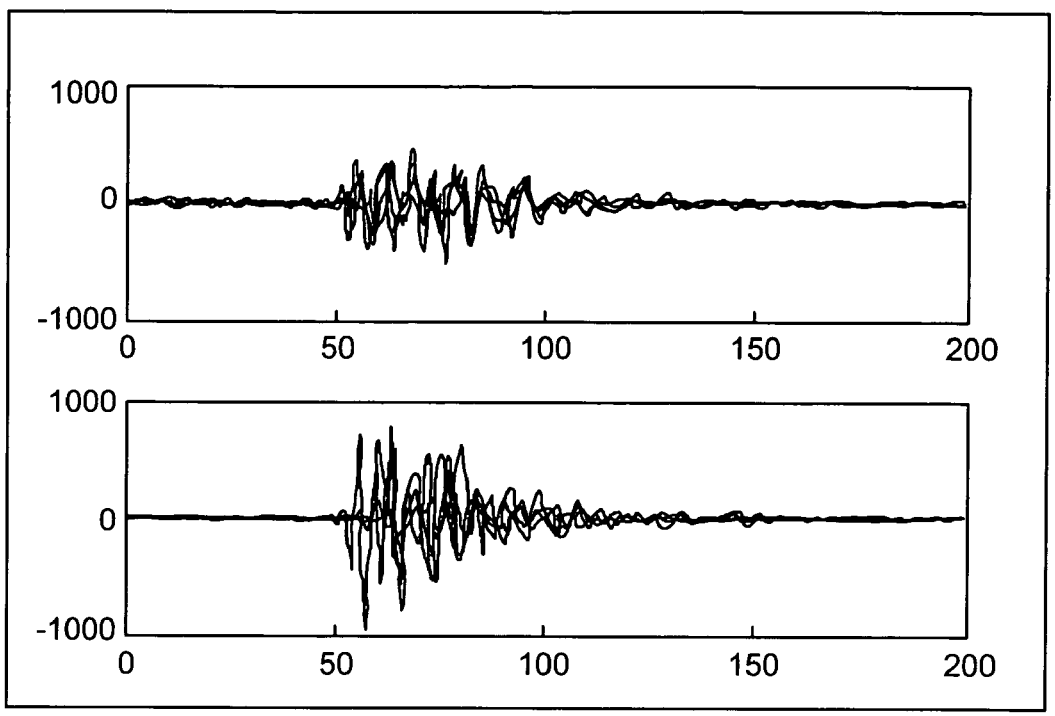
FIG. 31 shows pickup signals corresponding to the two contacts depicted in FIG. 30.
Figure 32:
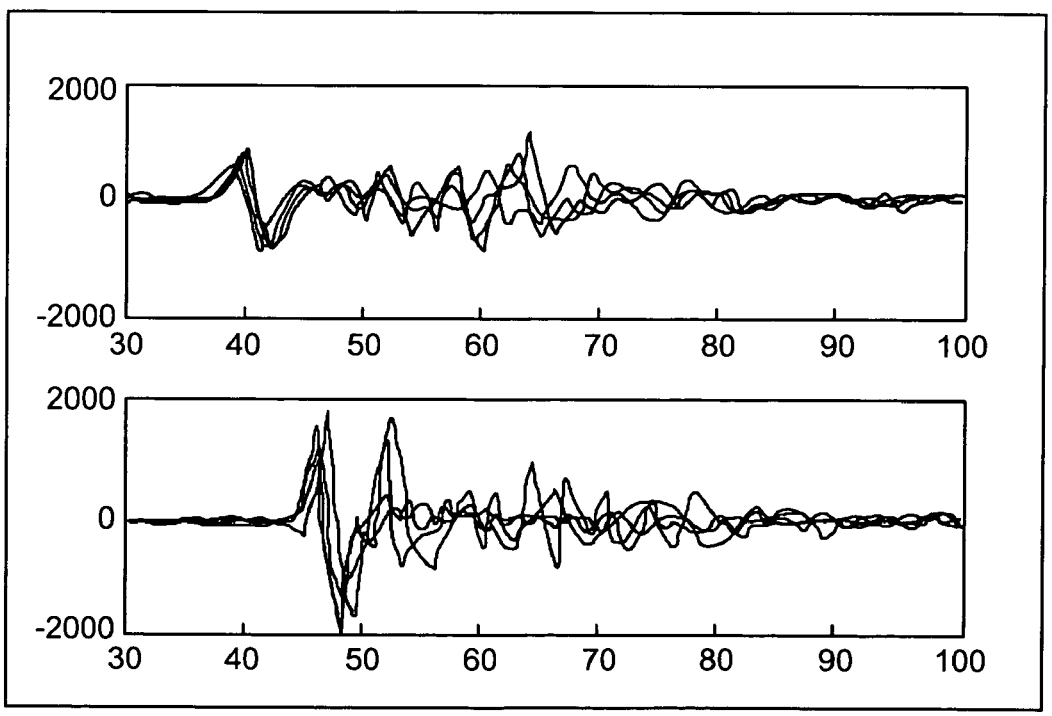
FIG. 32 shows impulse reconstructed signals corresponding to the two contacts depicted in FIG. 30.

Reference is now made to FIGS. 30-32. FIG. 30 shows the location of two contacts on a touch sensitive panel. The resulting pickup signals for the two contacts are shown in FIG. 31, where the four traces for each contact are shown in overlaid fashion. The traces of the second contact clearly show greater voltage levels. However, the shapes of the signals differ due to the different amount of dispersion associated with the contact/sensor separation. Detailed quantification of the relative level requires comparison of the impulse reconstructed traces, as shown in FIG. 32.

The impulse reconstructed signals shown in FIG. 32 allow the strength of touch to be determined with considerably greater accuracy than is possible using only the dispersed pickup signals. It is noted that the traces shown in FIG. 32 have been corrected for both the phase factor and square root amplitude decay with distance, whereas previous graphs were only corrected for phase factor. This full correction both aligns the impulses in time and also the overall amplitude. The relative strength of the impulses in this illustrative example is approximately a factor of two in voltage (6 dB).

The foregoing description of the various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What we claim is:

1. A method for use with a touch sensitive device comprising a touch plate to which a plurality of sensors are coupled, the method comprising:
   generating, in response to a touch to the touch sensitive device, sensor signals exhibiting dispersion;
   correcting for the dispersion in the sensor signals to produce dispersion corrected signals;
   determining a location of the touch using the dispersion corrected signals;
   determining dimensions of the touch plate and reconstructing impulses representative of impulses generated by the touch to the touch sensitive device using the determined touch plate dimensions; and
   confirming the location of the touch using the reconstructed impulses.

2. The method of claim 1, wherein reconstructing the impulses further comprises determining a dispersion relation of the touch plate.

3. The method of claim 1, wherein determining the dimensions of the touch plate comprises using an excitation transducer coupled to the touch plate and the plurality of sensors to determine the dimensions of the touch plate.

4. The method of claim 3, wherein determining the dimensions of the touch plate comprises:
   applying an excitation signal generated by the excitation transducer to the touch plate and sensing the excitation signal by each of the sensors;
   determining a transfer function of an input at the excitation transducer to an output at each of the sensors;
   determining, for each of the sensors, a dispersion corrected impulse response using the transfer function; and
   determining the dimensions of the touch plate using the respective dispersion corrected impulse responses.

5. The method of claim 1, wherein reconstructing the impulses comprises:
   determining a separation distance between the touch location and each of the sensors;
   developing, for each of the sensors, an inverse phase factor using the respective separation distances; and
   applying the inverse phase factor to the sensor signals to reconstruct the impulses.

6. The method of claim 1, wherein confirming the location of the touch comprises assessing similarity of one or more features of the reconstructed impulses.

7. The method of claim 6, wherein assessing similarity of the reconstructed impulses comprises:
   confirming the touch location as valid in response to the similarity assessment achieving a threshold; and
   considering the touch location as invalid in response to the similarity assessment failing to achieve the threshold.

8. The method of claim 1, wherein confirming the location of the touch comprises assessing synchronicity of the reconstructed impulses.

9. The method of claim 1, wherein confirming the location of the touch comprises assessing time of arrival and shape of each of the reconstructed impulses.

10. The method of claim 1, wherein confirming the location of the touch comprises:
   computing an average of the reconstructed impulses to emphasize a particular feature of the reconstructed impulses; and assessing similarity of the particular feature of the reconstructed impulses.

11. The method of claim 1, wherein confirming the location of the touch comprises:
   computing an average of the reconstructed impulses;
   applying a scaling factor to the computed average of the reconstructed impulses to produce a scaled reconstructed impulse, the scaling factor selected to emphasize first arrival energy of the averaged reconstructed impulses; and
   comparing the scaled reconstructed impulse against a threshold to confirm the touch location as valid or invalid.

12. The method of claim 1, wherein sensor signals are generated in response to a touch to a bezel or frame of the touch sensitive device, and confirming the location of the touch comprises confirming the touch to the bezel or frame as an erroneous touch.

13. A touch sensitive apparatus, comprising:
   a touch plate;
   a plurality of sensors coupled to the touch plate, each of the sensors configured to sense bending waves in the touch plate and, in response to a touch to the touch plate, generate sensor signals;
   an excitation transducer coupled to the touch plate and configured to induce bending waves in the touch plate, wherein the sensors produce induced bending wave signals responsive to the induced bending waves; and
   a controller coupled to the sensors, the controller correcting for dispersion in the sensor signals, determining a location of the touch using the dispersion corrected signals, computing dimensions of the touch plate using the induced bending wave signals, and reconstructing impulses representative of impulses generated by the touch to the touch sensitive device using the touch plate dimensions, the controller confirming the location of the touch using the reconstructed impulses.

14. The apparatus of claim 13, further comprising a plurality of active buffer circuits, each of the active buffer circuits respectively coupled to one of the sensors.

15. A touch sensitive apparatus, comprising:
   a touch plate;
   a plurality of sensors coupled to the touch plate, each of the sensors configured to sense bending waves in the touch plate and, in response to a touch to the touch plate, generate sensor signals;
   a plurality of active buffer circuits, each of the active buffer circuits respectively coupled to one of the sensors;
   an excitation transducer coupled to the touch plate and configured to induce bending waves in the touch plate; and
   a controller coupled to the sensors via the active buffer circuits and coupled to the excitation transducer via a non-actively buffered connection, the controller correcting for dispersion in the sensor signals, determining a location of the touch using the dispersion corrected signals, and reconstructing impulses representative of impulses generated by the touch to the touch sensitive device, the controller confirming the location of the touch using the reconstructed impulses.

16. The apparatus of claim 13, wherein the controller determines a dispersion relation of the touch plate, the controller using the dispersion relation to reconstruct the impulses.

17. The apparatus of claim 13, wherein the controller accesses data corresponding to dimensions of the touch plate and a dispersion relation of the touch plate, the controller using the data corresponding to the touch plate dimensions and dispersion relation to reconstruct the impulses.

18. The apparatus of claim 13, wherein the controller determines a separation distance between the touch location and each of the sensors, and develops an inverse phase factor associated with each of the sensors using the respective separation distances, the controller applying the inverse phase factor to the sensor signals to reconstruct the impulses.

19. The apparatus of claim 13, wherein the controller determines similarity of one or more features of the reconstructed impulses to confirm the location of the touch.

20. The apparatus of claim 19, wherein the controller confirms the touch location as valid in response to the similarity determination achieving a threshold and verifies the touch location as invalid in response to the similarity determination failing to achieve the threshold.

21. The apparatus of claim 13, wherein the controller evaluates synchronicity of the reconstructed impulses to confirm the location of the touch.

22. The apparatus of claim 13, wherein the controller evaluates time of arrival and shape of each of the reconstructed impulses to confirm the location of the touch.

23. A touch sensitive apparatus comprising a touch plate to which a plurality of sensors are coupled, the apparatus comprising:
   means for generating sensor signals in response to a touch to the touch sensitive device;
   means for correcting for dispersion in the sensor signals to produce dispersion corrected signals;
   means for determining a location of the touch using the dispersion corrected signals;
   means for reconstructing impulses representative of impulses generated by the touch to the touch sensitive device, wherein the reconstructing means comprises means for determining dimensions of the touch plate; and
   means for confirming the location of the touch using the reconstructed impulses.

24. The apparatus of claim 23, wherein the reconstructing means comprises means for determining a dispersion relation of the touch plate.

25. The apparatus of claim 23, wherein the dimensions determining means comprises means for applying an excitation signal to the touch plate and means for sensing signals responsive to the excitation signal.

26. The apparatus of claim 23, wherein the confirming means comprises means for assessing similarity of one or more features of the reconstructed impulses.

27. The apparatus of claim 26, wherein the assessing means comprises means for confirming the touch location as valid in response to the similarity assessment achieving a threshold and for considering the touch location as invalid in response to the similarity assessment failing to achieve the threshold.

28. The apparatus of claim 23, wherein the confirming means comprises means for assessing synchronicity of the reconstructed impulses.

* * * * *

UNITED STATES PATENT AND TRADEMARK OFFICE
CERTIFICATE OF CORRECTION

PATENT NO. : 7,315,300 B2
APPLICATION NO. : 10/750290
DATED : January 1, 2008
INVENTOR(S) : Nicholas P. R. Hill It is certified that error appears in the above-identified patent and that said Letters Patent is hereby corrected as shown below:

<u>First Page, Column 1</u>,
Lines 14-15, delete "This patent is subject to a terminal disclaimer"

<u>First Page, Column 2, Under Other Publications</u>,
Line 11, after "Sensitive" delete ".".

<u>Sheet 7 of 23, Figure 8, Reference Numeral 104</u>,
Line 2, delete "Tranducer 1" and insert -- Transducer 1 --, therefor.
Line 2, delete "Tranducer 2" and insert -- Transducer 2 --, therefor.
Line 2, delete "Tranducer N" and insert -- Transducer N --, therefor.

<u>Sheet 12, of 23, Figure 13, Reference Numeral 344</u>,
Line 1, delete "Dimemsions' and insert -- Dimensions --, therefor.

<u>Column 6</u>,
Line 41, delete "t=1" and insert -- t=0 --, therefor.

<u>Column 18</u>,
Line 16, delete "14" and insert -- 1-4 --, therefor.

Signed and Sealed this

Fifth Day of August, 2008

JON W. DUDAS
*Director of the United States Patent and Trademark Office*